United States Patent [19]
Inokuchi et al.

[11] Patent Number: 6,144,969
[45] Date of Patent: Nov. 7, 2000

[54] FILE NAME CONVERSION

[75] Inventors: Tatsuya Inokuchi; Osamu Udagawa; Yasuyoshi Kaneko; Kazuhisa Taira, all of Kanagawa, Japan

[73] Assignee: Sony Corporation, Tokyo, Japan

[21] Appl. No.: 08/930,820

[22] PCT Filed: Feb. 7, 1997

[86] PCT No.: PCT/JP97/00321

§ 371 Date: Jan. 8, 1998

§ 102(e) Date: Jan. 8, 1998

[87] PCT Pub. No.: WO97/29426

PCT Pub. Date: Aug. 14, 1997

[30] Foreign Application Priority Data

Feb. 9, 1996 [JP] Japan .................................. 8-048211

[51] Int. Cl.[7] .................................................. G06F 17/30
[52] U.S. Cl. .............................................. 707/200; 707/1
[58] Field of Search ........................ 707/200, 1; 395/500

[56] References Cited

U.S. PATENT DOCUMENTS

| | | | |
|---|---|---|---|
| 5,359,725 | 10/1994 | Garcia et al. | 707/200 |
| 5,579,517 | 11/1996 | Reynolds et al. | 707/200 |
| 5,608,905 | 3/1997 | Weinstein | 707/205 |
| 5,627,996 | 5/1997 | Bauer | 395/500 |
| 5,745,752 | 4/1998 | Hurvig et al. | 707/200 |
| 5,745,888 | 4/1998 | Bauer et al. | 707/1 |
| 5,745,902 | 4/1998 | Miller et al. | 707/200 |
| 5,754,848 | 5/1998 | Hanes | 707/200 |
| 5,758,352 | 5/1998 | Reynolds et al. | 707/200 |
| 5,761,675 | 6/1998 | Isenberg | 707/200 |

FOREIGN PATENT DOCUMENTS

| | | | |
|---|---|---|---|
| 6-161855 | 6/1994 | Japan | G06F 12/00 |
| 6-187211 | 7/1994 | Japan | G06F 12/00 |
| 6-231023 | 8/1994 | Japan | G06F 12/00 |
| 6-309207 | 11/1994 | Japan | G06F 12/00 |
| 7-503084 | 3/1995 | Japan | G06F 12/00 |

OTHER PUBLICATIONS

Y. E. Gail Wang, "Universal–File–Names for Ada," Ada Letters, vol. 10, No. 1, Feb. 1990, pp. 111–117.

*Primary Examiner*—Thomas G. Black
*Assistant Examiner*—Frantz Coby
*Attorney, Agent, or Firm*—Limbach & Limbach LLP

[57] ABSTRACT

File name conversion method, and apparatus, for converting a first file name that can be distinguished by a given operating system into a second file name that can be distinguished both by the given operating system and other operating systems. The method and apparatus insure that the first and second file names do not already exist on an associated recording medium prior to recording the first file name on the recording medium and prior to converting the first file name to the second file name. Also provided is a recording medium on which is recorded a file conversion program for converting the first file name to the second file name and for searching whether or not the file names exist on the recording medium.

19 Claims, 27 Drawing Sheets

| Sequence Number | | LBA |
|---|---|---|
| 123456789abcdef0h | → | 1000h |
| 123456789abcdef1h | → | 1001h |
| 123456789abcdef2h | → | 1002h |
| 123456789abcdef3h | → | 1003h |
| 123456789abcdef4h | → | 1004h |

FIG. 6

| number of entry | 6 |
|---|---|
| free | 2 |
| table[0] | 30 |
| table[1] | 6 |
| table[2] | 4 |
| table[3] | 4 |
| table[4] | 1 |
| table[5] | 22 |

FIG. 7

| Leaf Node | $1 \times 2^{20}$ kbyte /2 kbyte /(145 extent/2) = 7231.6 block = 7232 block |
|---|---|
| Index Node (3rd level) | 72312 block / (170 index/2) = 850.7 block = 851 block |
| Index Node (2nd level) | 851 block / (170 index/2) = 10.01 block = 11 block |
| Index Node (root) | 1 block |
| total | 8095 block |

FIG. 8

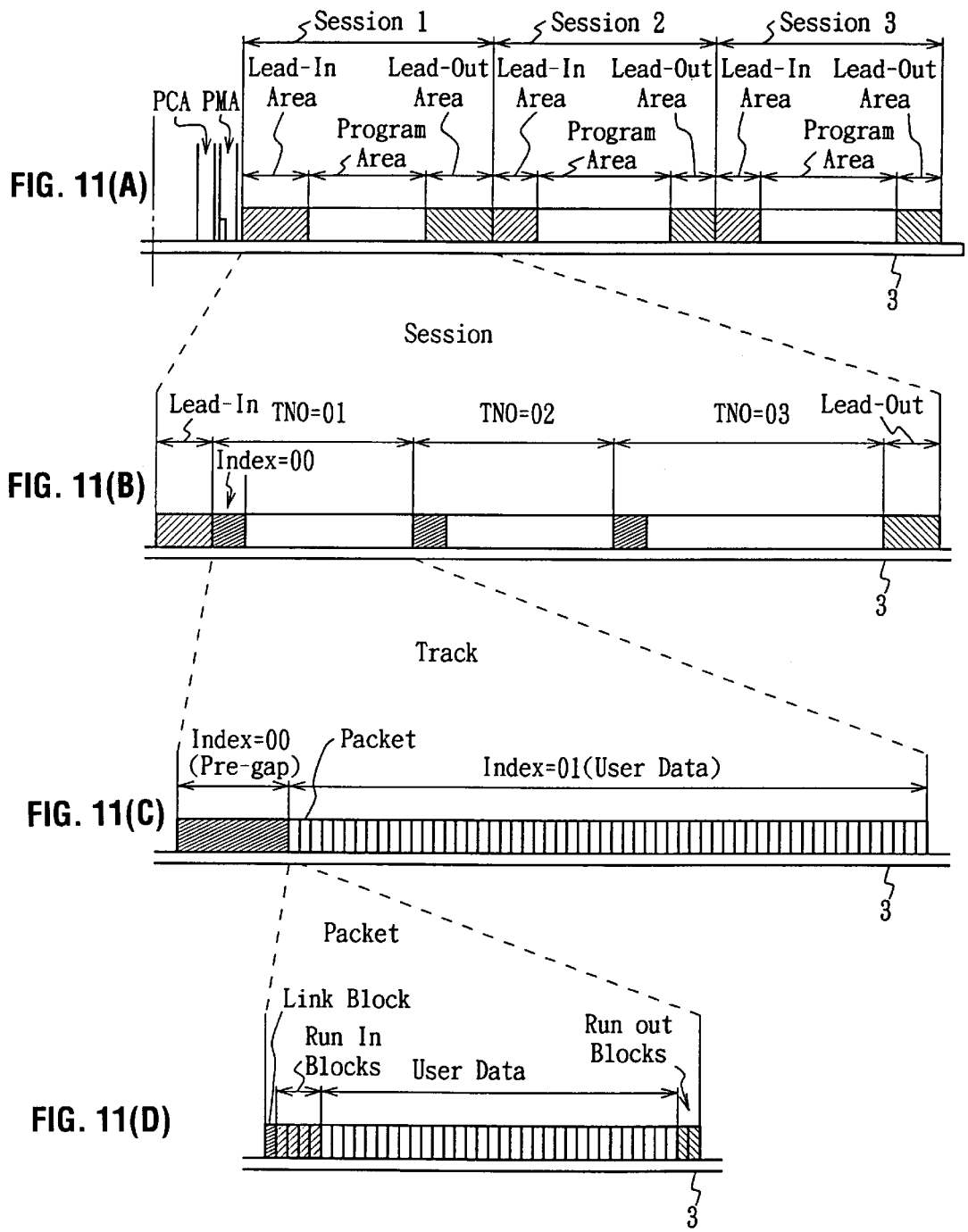

| Start | Length | contents |
|---|---|---|
| 1152 | 5 | File System Standard ID (= "CDRFS") |
| 1157 | 1 | File System Version |
| 1158 | 16 | Copyright (= "Sxxx CORPORATION") |
| 1174 | 1 | Super Block Search Method |
| 1175 | 1 | Reserved (= 0) |
| 1176 | 4 | Super Block LBA |
| 1180 | 4 | Start LBA of Super Block Area |
| 1184 | 4 | End LBA of Super Block Area |
| 1188 | 2 | File System Flags |
| 1190 | 2 | Packet Size (Addressing Method-II only) |
| 1192 | 4 | Volume Capacity |
| 1196 | 852 | Reserved (= 0) |

FIG. 12

| Start | Length | contents |
|---|---|---|
| 0 | 64 | Super Block Header |
| 64 | 2 | Super Block Version |
| 66 | 2 | Super Block Flags |
| 68 | 4 | Node Table LBA |
| 72 | 4 | Previous Super Block LBA |
| 76 | 4 | Sequence B*Tree Root Node Number |
| 80 | 4 | Directory B*Tree Root Node Number |
| 84 | 4 | Serial Number |
| 88 | 400 | Super Block List |
| 488 | 1536 | Super Block Tag List |
| 2024 | 20 | Reserved (= 0) |
| 2044 | 4 | Check Sum |

FIG. 13

| Start | Length | contents |
|---|---|---|
| 0 | 4 | Super Block LBA |
| 4 | 4 | Creation Time |

FIG. 14

| Start | Length | contents |
|---|---|---|
| 0 | 4 | Super Block LBA |
| 4 | 4 | Creation Time |
| 8 | 56 | Tag String |

FIG. 15

| Start | Length | contents |
|---|---|---|
| 0 | 4 | Number of Entry (= Ne) |
| 4 | 4 | Free Entry |
| 8 | 4 | entry[0] |
| 12 | 4 | entry[1] |
| 16 | 4 | entry[2] |
| • | • | • |
| • | • | • |
| • | • | • |
| 4Ne+8 | 4 | entry[Ne-1] |

FIG. 16

| Start | Length | contents |
|---|---|---|
| 0 | 4 | Node Number |
| 4 | 1 | Number of records |
| 5 | 3 | reserve (0) |
| 8 | 12 | Index Record[0] |
| 20 | 12 | Index Record[1] |
| ⋮ | ⋮ | ⋮ |
| 2036 | 12 | Index Record[169] |

FIG. 17

| Start | Length | contents |
|---|---|---|
| 0 | 8 | Key |
| 8 | 4 | Node Number |

FIG. 18

| Start | Length | contents |
|---|---|---|
| 0 | 4 | Node Number |
| 4 | 1 | Number of records |
| 5 | 3 | reserved (= 0) |
| 8 | 4 | Previous Node Number |
| 12 | 4 | Next Node Number |
| 16 | 2 | reserved (= 0) |
| 18 | 14 | Extent Record[0] |
| 32 | 14 | Extent Record[1] |
| ⋮ | ⋮ | ⋮ |
| 2034 | 14 | Extent Record[144] |

FIG. 19

| Start | Length | contents |
|---|---|---|
| 0 | 8 | Key |
| 8 | 4 | LBA |
| 12 | 2 | Length |

FIG. 20

| Start | Length | contents |
|---|---|---|
| 0 | 4 | Node Number |
| 4 | 1 | Number of records |
| 5 | 1 | reserve (0) |
| 6 | 2 | Total Size of Records |
| 8 | 4 | Previous Node Number |
| 12 | 4 | Next Node Number |
| 16 | 2 | End of Free Area |
| 18 | 2030 | Directory Record Area |

PosX:Directory Record Offset
RecX:Directory Record
Free:Free Area

| Start | Length | contents |
|---|---|---|
| 0 | 8 | Key |
| 8 | 2 | Size |
| 10 | 1 | Type |
| 11 | 1 | Attribute |
| 12 | 2 | Mode |
| 14 | Size - 14 | Other Attribute |

| Start | Length | contents |
|---|---|---|
| 0 | 4 | Directory Number |
| 4 | 2 | Hashed Key |
| 6 | 2 | Sequencial Number |

FIG. 24

| Type | KIND |
|---|---|
| Type = 0 | File |
| Type = 1 | Directory |
| Type = 2 | Volume Label (Root Directory) |
| Type = 3 | Symbolic Linc |
| Type = 4 | Hard Linc |

FIG. 25

| Start | Length | contents |
|---|---|---|
| 0 | 8 | Key |
| 8 | 2 | Size |
| 10 | 1 | Type |
| 11 | 1 | Attribute |
| 12 | 2 | Mode |
| 14 | 2 | Number of Links |
| 16 | 2 | User Name |
| 18 | 2 | Group Name |
| 20 | 4 | Last Access Time |
| 24 | 4 | Last Modification Time |
| 28 | 4 | Creation Time |
| 32 | 8 | File Size |
| 40 | 4 | Sequence Number |
| 44 | 1 | Name Length (=NL) |
| 45 | NL | File Name |

FIG. 26

| Start | Length | contents |
|---|---|---|
| 0 | 8 | Key |
| 8 | 2 | Size |
| 10 | 1 | Type |
| 11 | 1 | Attribute |
| 12 | 2 | Mode |
| 14 | 2 | Number of Links |
| 16 | 2 | User Name |
| 18 | 2 | Group Name |
| 20 | 4 | Last Access Time |
| 24 | 4 | Last Modification Time |
| 28 | 4 | Creation Time |
| 32 | 4 | DirectoryID |
| 36 | 1 | Name Length (=NL) |
| 37 | NL | Directory Name |

FIG. 27

| Start | Length | contents |
|---|---|---|
| 0 | 8 | Key |
| 8 | 2 | Size |
| 10 | 1 | Type |
| 11 | 1 | Reserve (=0) |
| 12 | 8 | Link |
| 20 | 1 | Name Length (=NL) |
| 21 | NL | Link Name |

FIG. 28

| | | |
|---|---|---|
| FILE ENTRY | Key | Directory Number |
| | | SEARCH KEY CRC, Distinct Number |
| | | SIZE OF FILE ENTRY, AND SO ON |
| | Object Name Area | Name Conversion Flags (SET WHETHER Distinct Name IS USED OR Simple Name IS USED IN EACH OS) |
| | | Name Discipline / HT Flag |
| | | LENGTH OF FILE NAME (NUMBER OF CHARACTERS) |
| | | Object Name (NAME SPECIFIED WHEN FILE IS CREATED, ORIGINAL FILE NAME) |

FIG. 31

| CHARACTER STRING FOR CONVERSION | CHARACTER CODES | CRC |
|---|---|---|
| ABCD | 0x41424344 | 0x3b3a (15162) |
| AB__ | 0x41425f5f | 0xde7e (56958) |
| _CSH | 0x5f435348 | 0x7708 (30472) |
| TEST | 0x54455354 | 0x080a ( 2058) |
| A___ | 0x415f5f5f | 0xdf4c (57164) |
| A_B_ | 0x415f425f | 0xaa63 (43619) |
| CUCW | 0x43554357 | 0x32f3 (13043) |
| ABC1 | 0x41424331 | 0x1508 ( 5348) |

FIG. 43

| Object Name | CONVERTED NAME | CHARACTER STRING FOR CONVERSION | CRC |
|---|---|---|---|
| Abcd#123.efg | ABCD_123_EFG | ABCD | 0x3b3a |
| ab | AB | AB__ | 0xde7e |

FIG. 44

| DNO | String | Simple Name | Distinct Name |
|---|---|---|---|
| 4 | ~4 | ABCD.TXT | ABCD~4.TXT |
| 57 | ~OL | 0123452675 | 0123452~OL |
| 745 | ~JP | aksdlewidlk | aksdlewidlk~JP |
| 40695 | ~UDF | ABCDEFGH | ABCD~UDF |

FIG. 37

| Object Name | CONVERTED NAME |
|---|---|
| Abcd~12.fg | Abcd~12 |
| ab | ab |
| .cshrc | .cshrc |
| test. | test. |
| a.exe | a |
| a.b.c.d | a.b.c |
| あい~123.exe | あい~123 |
| ＡＢＣ１２３ | ＡＢＣ１２３ |

FIG. 38

$0 \leq x < 128$

| CHARACTER CODE | CONVERSION | ACTUAL CHARACTERS | CONVERTED CHARACTERS |
|---|---|---|---|
| $0x30 \leq x \leq 0x39$ | x | 0-9 | 0-9 |
| $0x61 \leq x \leq 0x7a$ | x - 0x20 | a-z | A-Z |
| $0x41 \leq x \leq 0x5a$ | x | A-Z | A-Z |
| other x | 0z5f | other | _ |

FIG. 39

$128 \leq x \leq 65535$

| CHARACTER CODE | CONVERSION | ACTUAL CHARACTERS | CONVERTED CHARACTERS |
|---|---|---|---|
| 0xff10 ≤ x ≤ 0xff19 | x - 0xfee0 | 0-9 | 0-9 |
| 0xff41 ≤ x ≤ 0xff5a | x - 0xff00 | a-z | a-z |
| 0xff21 ≤ x ≤ 0xff3a | x - 0xfee0 | A-Z | A-Z |
| other x | m[(x/256) mod 36], m[(x&255) mod 36] | CHINESE CHARACTERS AND SO ON | 0-9, A-Z |

FIG. 40

| Object Name | CONVERTED NAME |
|---|---|
| Abcd~12 | ABCD_12 |
| ab | AB |
| .cshrc | _CSHRC |
| test. | TEST_ |
| a | A |
| a.b.c | A_B_C |
| あい_123 | CUCW_123 |
| ＡＢＣ１２３ | ABC123 |

FIG. 41

| CONVERTED Object Name FOR CREATING CRC | CONVERTED NAME |
|---|---|
| ABCD_12 | ABCD |
| AB | AB__ |
| _CSHRC | _CSH |
| TEST_ | TEST |
| A | A___ |
| A_B_C | A_B_ |
| CUCW_123 | CUCW |
| ABC123 | ABC1 |

FIG. 42

| | DOS COMPATIBLE (MS-DOS) | Windows NT/95 | UNIX | Macintosh(System7.X) |
|---|---|---|---|---|
| LENGTH OF FILE NAME UPPER CASE/ LOWER CASE CHARACTERS NOT USABLE FOR FILE NAME | 8.3 byte<br><br>NOT DISTINGUISHED<br><br>¥/:*?"<>\|+=[].space | 255 characters USABLE<br><br>BUT NOT DISTINGUISHED<br><br>¥/:,;*?"<>\| | 14-255 byte<br><br>DISTINGUISED<br><br>/ | 31 byte<br><br>DISTINGUISED<br><br>: |
| LENGTH OF FULL PATH DEFINITION OF PATH NAME | 66 byte<br>file(Diredtory),NAME DELIMITED BY "¥" | 259 characters<br>file(Folder)NAME DELIMITED BY "¥" | 255 byte<br>file(Directory) NAME DELIMITED BY "/" | 255 byte<br>file(Folder)NAME DELIMITED BY ":" |
| Time | Creation Time | Creation Time<br>Modified Time<br>Last Access Date | Change 1 node Time<br>Modified Time<br>Last Access Time | Created Time<br>Modified Time |
| Attribute | Read Only<br>Hidden<br>System<br>Volume<br>Directory<br>Archived | Read Only<br>Hidden<br>System<br>Volume<br>Directory<br>Archived<br>HPFS Extended Attribute(EA)<br><br>(Symbolic Link) | User(R,W,X)<br>Group(R,W,X)<br>Other(R,W,X)<br><br>Directory<br>Character Device<br>Block Device<br>FIFO<br><br>(Symbolic Link)<br>(Socket) | File Locked<br>Invisible<br>Bundle<br>System<br>NoCopy(Bozo)<br>Busy<br>Changed<br>Inited<br>Shared<br>Always SwitchLaunch<br>Never SwitchLaunch<br>On Desk |

FIG. 46

FILE NAME CONVERSION

TECHNICAL FIELD

The present invention relates to an information processor, a method of information processing, and a recording medium recorded a file name conversion program thereon, which are suitably applied to have file names recorded, for example, on a write-once disc recording medium accessed by a plurality of operation system.

PRIOR ART

Conventionally, as operation systems (OS) for computers, there are, for example, System 7.5 (trademark) for Macintosh, MS-DOS (Microsoft Disk Operating system) (trademark) and Windows (trademark) of Microsoft, Unix (trademark), and so on which have their own specifications. Files created on each of the plurality of operating systems are mutually accessible among these operating systems.

However, when a file name is to be set to a file under the control of a certain operating system, the operating system requires a kind of permitted characters and a limited number of characters limited by its own specifications as well as predetermined attributes given to the file, as shown in FIG. 46. For this reason, for reading a file managed by an operating system (A) from a computer managed by another operating system (B), the computer requires the user to somehow convert the file so as to be readable on the operating system (B), so that the laborious conversion is forced to the user.

For example, comparing the specifications for a file name provided by System 7.5 of Macintosh and MS-DOS of Microsoft, System 7.5 of Macintosh allows to designate a file name up to a maximum of 31 characters, while MS-DOS of Microsoft only allows to designate a file name up to a maximum of eight characters and additional three characters of extension.

The difference in the specifications regarding to a file name between the two operating systems causes the inability of MS-DOS to manage a file given a name such as "abcdefghijklmnopqrstuvexyz" on System 7.5 which is the operating system of Macintosh, as illustrated in FIG. 47. As a result, although a file name of 31 characters may be used on System 7.5, a file must be given a name of eight characters and an extension of three characters also on System 7.5 only for reading the file on a computer running MS-DOS, thus forcing a significant inconvenience to the user.

As described above, the conventional file management method individually manages files created on a plurality of registered different operating systems without considering differences in the specifications among these operating systems, so that the user must take part in the file management. However, a problem arises that the user cannot create a file commonly usable among a plurality of operating systems unless he knows the difference in the specifications of the respective operating systems.

In addition, even the same operating system may give rise to a problem when it has different versions. For example, even if a Japanese file name can be given to a file on a version of an operating system which supports display in Japanese language, the Japanese file name cannot be referenced on a different version of the same operating system which does not support a Japanese environment or a version which does not have a function of displaying Japanese characters. Thus, even under the same operating system, the user suffers from complicated handling of file names.

Specifically, file names must be previously unified in a single character set such as alphabet or the like in consideration of languages supported by different versions of the same operating system.

Further, the respective operating systems may set identical attributes to files but in a different management method. Thus, even if a write to a file is disabled on a certain operating system, a write to the file may be enabled on a different operating system.

The present invention has been made in view of the problems mentioned above, and its object is to propose a recording/reproducing apparatus and a file management method therefor which facilitate the file management among different operating systems.

DISCLOSURE OF THE INVENTION

The present invention is relates to an information processing apparatus having a recording medium recorded file names thereon and working by at least first operating system, which provides a file name conversion method for converting a first file name which can be distinguished by the first operating system to at least second file name which can be distinguished by a second operating system, comprising a step for transferring the first file name from the first operating system, a first same file name searching step for searching whether or not there exists the first file name on the recording medium on the first operating system, a first file name writing step for writing the first file name on the recording medium in the case where no same file name is found at the first file name searching step, a first file name conversion step for converting the first file name to a third file name in correspondence to a second operating system, a second same file name searching step for converting the file name in conformity with the second operating system and searching whether or not the file name exists on the recording medium, and a recording step for recording the third file name as a second file name on the recording medium in the case where no same file name is found at the second same file name searching step.

Further, the present invention provides storing means for storing the first operating system, inputting means for inputting a file name from the first operating system, first same file name searching means for searching whether or not there exists the first file name on the recording medium on the first operating system, first file name writing means for writing the first file name on the recording medium in the case where no same file name is found in the first file name searching means, first file name conversion means for converting the first file name to a third file name in correspondence to a second operating system, second same file name searching means for converting the file name in conformity with the second operating system and searching whether or not the file name exists on the recording medium, and recording means for recording the third file name as a second file name on the recording medium in the case where no same file name is found at the second same file name searching means.

Further, the present invention relates to an information processing apparatus having a recording medium recorded file names thereon and working by at least first operating system, the recording medium being recorded a file name conversion program thereon for converting a first file name which can be distinguished by the first operating system to at least second file name which can be distinguished by a second operating system, wherein the program comprising a step for transferring the first file name from the first operating system, a first same file name searching step for searching whether or not there exists the first file name on the recording medium on the first operating system, a first file name writing step for writing the first file name on the recording medium in the case where no same file name is found at the first file name searching step, a first file name conversion step for converting the first file name to a third file name in correspondence to a second operating system, a second same file name searching step for converting the file name in conformity with the second operating system and searching whether or not the file name exists on the recording medium, and a recording step for recording the third file name as a second file name on the recording medium in the case where no same file name is found at the second same file name searching step.

According to the present invention, in an information processing apparatus for accessing a file recorded on a recording medium in conformity to specifications defined by a plurality of operating systems, means for converting a first file name based on the specifications of an operating system used for file creation/file name change to a second file name based on the specifications of an operating system used for accessing the file is provided for all of the plurality of operating systems, thereby file accesses among a plurality of different plurality of operating systems can be realized.

Also, according to the present invention, a file name converting step is provided for converting a first file name set on any of the plurality of operating system to second file names corresponding to the specifications of all of the plurality of operating systems at the time of accessing a file recorded on a recording medium in conformity to specifications defined by the plurality of operating systems. Therefore it becomes possible to simplify the file access among a plurality of different operating systems having different specifications.

BRIEF DESCRIPTION OF THE DRAWINGS

FIG. 6 is a schematic diagram showing an example of a correspondence

FIG. 7 is a schematic diagram showing node table.

FIG. 8 is a schematic diagram explaining maximum number of blocks.

FIGS. 11(A) to 11(D) are schematic diagrams explaining renewal of the data blocks.

FIG. 12 is a schematic diagram showing the structure of PVD.

FIG. 13 is a schematic diagram showing the structure of super block.

FIG. 14 is a schematic diagram showing the structure of super block list entry.

FIG. 15 is a schematic diagram showing the structure of tag entry.

FIG. 16 is a schematic diagram showing the structure of node table.

FIG. 17 is a schematic diagram showing the structure of a B*Tree (B Star-tree) index node.

FIG. 18 is a schematic diagram showing the structure of index record.

FIG. 19 is a schematic diagram showing the structure of a sequence B*Tree (B Star-tree) leaf node.

FIG. 20 is a schematic diagram showing the structure of extent record.

FIG. 24 is a schematic diagram showing the structure of directory record key.

FIG. 25 is a schematic diagram explaining the kinds of types.

FIG. 26 is a schematic diagram showing the structure of file directory record.

FIG. 27 is a schematic diagram showing the structure of directory directory record.

FIG. 28 is a schematic diagram showing the structure of link directory record.

FIG. 31 is a schematic diagram showing the structure of file entry.

FIG. 37 is a schematic diagram explaining file name conversion.

FIG. 38 is a schematic diagram explaining file name conversion.

FIG. 39 is a schematic diagram explaining file name conversion.

FIG. 40 is a schematic diagram explaining file name conversion.

FIG. 41 is a schematic diagram explaining file name conversion.

FIG. 42 is a schematic diagram explaining file name conversion.

FIG. 43 is a schematic diagram explaining generation of the search key.

FIG. 44 is a schematic diagram explaining file name conversion.

FIG. 46 is a schematic diagram explaining limitation of the file name.

BEST MODE FOR CARRYING OUT THE INVENTION

Figure 1:
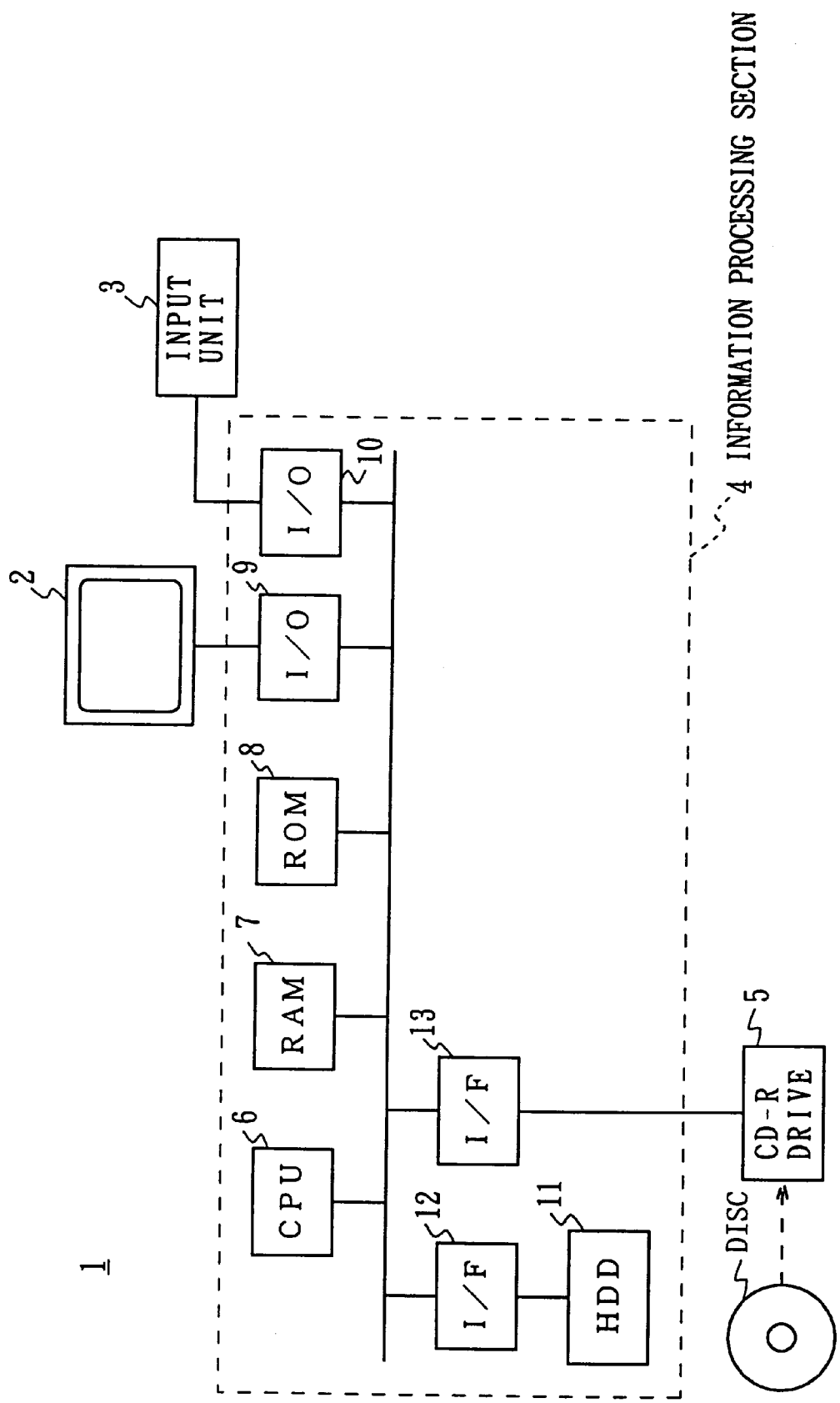
FIG. 1 is a block diagram showing the whole configuration of a CD-R disc apparatus according to the present invention.

In FIG. 1, 1 generally shows a CD-R disc device containing an information processing section 4 for processing a data to be written on a CD-R disc DISC or a data read out from the CD-R disc DISC, a display unit 2 comprising such members as a cathode ray tube or a liquid crystal display for supplying the user with processed data, processing state of the information of the information processing section 4, an input device 3 comprising a keyboard and the like for inputting data to the information processing section 4, and a CD-R drive device 5 for writing in and reading out data to and from the CD-R disc DISC.

The information processing section 4 has respectively a CPU (Central Processing Unit) 6 for managing entire operation of a system, a RAM (Random Access Memory) 7 for temporarily storing all kinds of information and various programs, a ROM (Read Only Memory) 8 in which a basic program necessary for the CPU 6 to operate is stored, an input/output (I/O) circuit 9 for outputting information to the display unit 2, an input/output (I/O) circuit 10 for capturing information from the input device 3, a hard disk drive (HDD) 11 for accessing a hard disk in which various programs are stored, an interface (I/F) circuit 12 for accessing the hard disc drive 11, and an interface (I/F) circuit 13 for accessing the CD-R drive 5. Incidentally, the RAM 7 functions as a cache buffer besides a simple memory.

In the information processing section 4 having the aforesaid structure, the CPU 6 reads out program of the file system for CD-R (CDRFS: Compact Disc Recordable File System) from the hard disk 11 via the interface (I/F) 12 based on the program stored in the ROM 8, and then stores it in the RAM 7. The CPU 6 then starts CDRFS read out so as to start the entire system.

In order to record data in the CD-R disc DISC in the CD-R disc device 1 started up, the CPU 6 divides the data made by the user into blocks according to a predetermined format under the control of CDRFS. Then the CPU 6 transmits the divided data and an instruction to the CD-R drive 5 so as to write the data via the interface circuit 13. When receiving the instruction, the CD-R drive 5 sequentially records the data for the data unit referred to as packet on the CD-R disc DISC.

In addition, when the data recorded in the CD-R disc DISC is read out, the CPU 6 of the information processing section 4 gives a reading instruction to the CD-R drive 5 via the interface circuit 13. When receiving the instruction, the CD-R drive 5 accesses the CD-R disc DISC so as to read out the data recorded for packet, and then transmits the data to the RAM 17 via the interface circuit 13.

Figure 2:
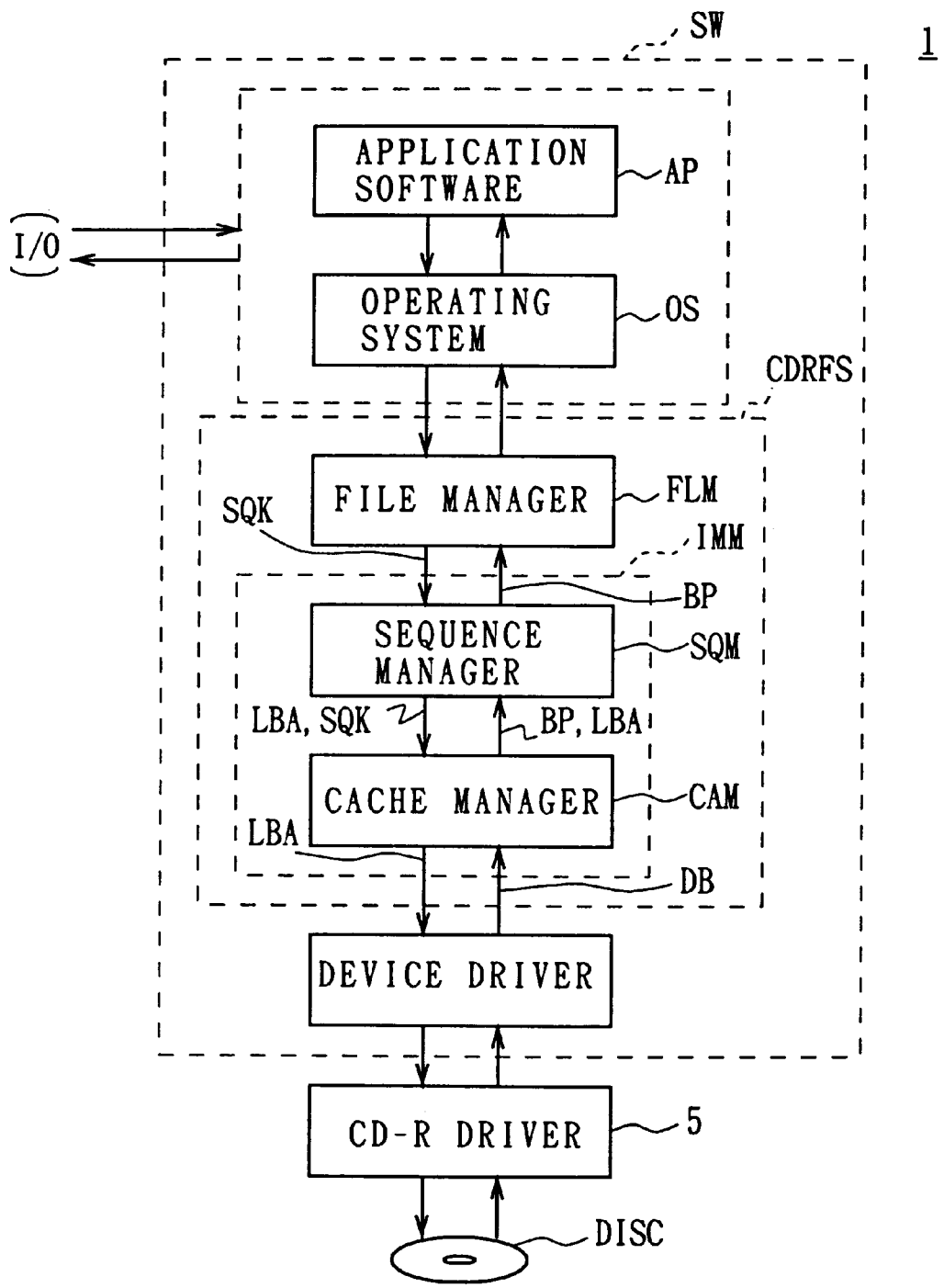
FIG. 2 is a block diagram showing the configuration of CDRFS according to the present invention.

FIG. 2 shows the entire structure of a software SW by which it seems as if the CD-R disc DISC is a recording medium capable of rewriting to the user. The instruction from the user input via I/O is interpreted in an application software AP and an operating system OS, and the instruction is delivered to a file manager FLM of the file system for CD-R CDRFS.

The file system CDRFS comprises the file manager FLM constituting upper layer part and a virtual device manager IMM constituting lower layer part. The file manager FLM manages directories and files. Thus, when the operating system OS sends, for example, overwriting instruction to the file manager FLM, the file manager FLM specifies correspondent virtual address space formed in a virtual device manager IMM based on the file name specified by the instruction.

Figure 3:
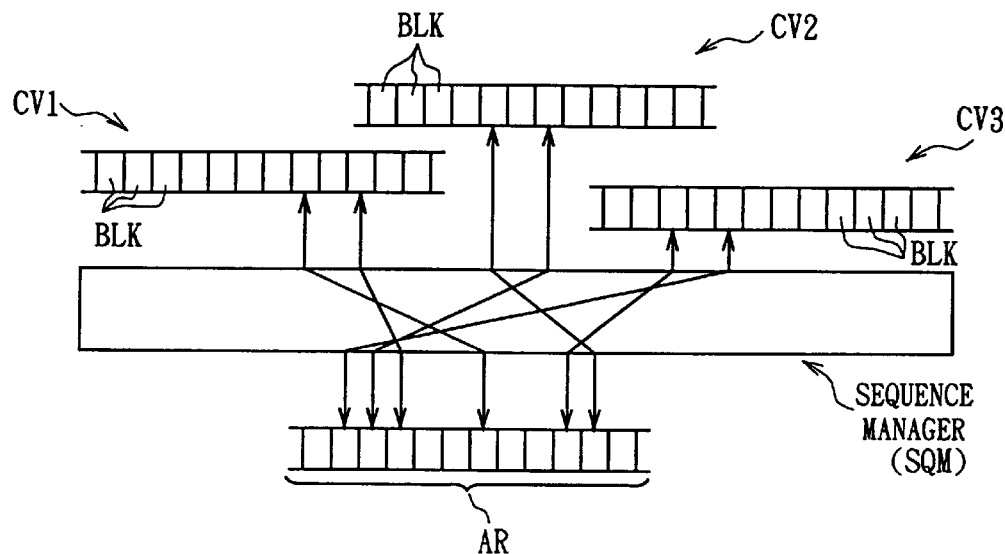
FIG. 3 is a schematic diagram explaining management of a plurality of virtual address space according to sequence manager SQM.

Here, as shown in FIG. 3, the virtual device manager IMM provides a plurality of virtual address space CVx (CV1, CV2, CV3, . . . ) to the file manager FLM. Each virtual address space CVx is constituted by a data block array comprising single or a plurality of data block. The data block array is referred to as a sequence and corresponds to each file managed by the file manager FLM. Accordingly, the file manager FLM specifies the sequence number of the virtual device manager IMM so as to specify the virtual address space CVx of the target file. At this time, the file manager FLM can specify each virtual address space CVx in block units according to 64-bit logical address called sequence key SQK (FIG. 2).

More specifically, in the virtual device manager IMM, each virtual address space CVx is managed by the sequence key SQK in block units. The particular sequence number for the virtual address space CVx is allotted to the upper 32 bits of the sequence key SQK, and the lower 32 bits are the sequence block number for specifying blocks BLK (FIG. 3) in the sequence (virtual address space) specified by the upper 32 bits. Consequently, $2^{32}$ blocks per one virtual address space (one sequence) can be managed by the sequence block number; namely, each virtual address space CVx are adopted to include 232 blocks. Each block BLK is 2048 bytes in agreement with CD-R disc format, which enables the virtual device manager IMM to manage 8 tera bytes at the most for one sequence, namely one file.

In this manner, in the virtual device manager IMM, each virtual address space CVx is provided corresponding to the files so as to constitute a file. Consequently, the virtual device manager IMM can immediately access the file without executing such complicated procedure as converting the position of the file to the logical address and retrieving.

Thus, when the logical address directly corresponding to the file shown by the 64-bit sequence key SQK from the file manager FLM is delivered to the virtual device manager IMM, the sequence manager SQM of the virtual device manager IMM (FIG. 2) makes the logical address shown by the sequence key SQK correspond to the physical address on the CD-R disc by using the retrieving method by means of the multiway tree referred to as B*tree (B Star-tree).

Figure 4:
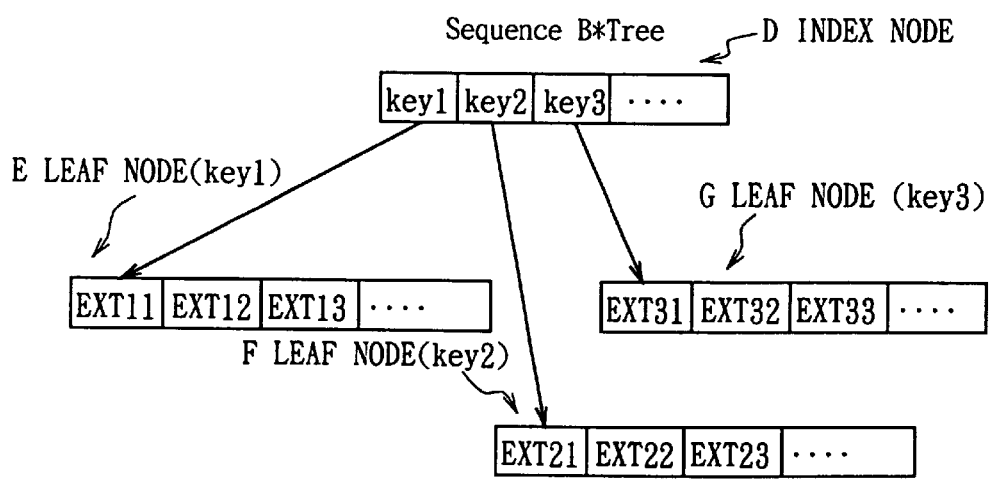
FIG. 4 is a schematic diagram explaining management structure by B*tree (B Star-tree).

More specifically, as shown in FIG. 4, B*tree (B Star-tree) of the sequence manager SQM has a tree structure which is constituted by an index node K as an intermediate node (branch) and leaf nodes E, F and G which actually contain the extent (EXTx) showing correspondence between the logical address and the physical address.

Each leaf node E, F, and G stores single or a plurality of extent EXTx representing the relation between the logical address and the physical address LBA, which is shown by the sequence key SQK, in the ascending order of the sequence key SQK. More specifically, the extent EXTx manages (or represents) a block array in which the sequence key SQK continues in the ascending order as one unit out of the blocks sequentially in array on physical location on the CD-R disc. The extent EXTx consists of the sequence key SQK in the head block of sequential physical block managed by the extent EXTx, the physical address LBA corresponding to the sequence key SQK, and length. The length represents a continuous physical block number represented by the extent EXTx with the physical address LBA placed at the front in which the length is included. Consequently, for example, when the extent EXTx is represented by (0,0 56 5), the physical address LBA on the CD-R disc corresponding to the sequence key SQK (logical address) which is referred to as 0,0 is 56, which represents that the data represented by the extent continues five blocks with the physical address LBA (=56) placed at the head on the CD-R disc.

These five data blocks managed by one extent EXTx is written on physical areas which are continuous on the CD-R disc so that it is possible to avoid an increase in the number of extent EXTx which constitutes an element of an address conversion table of the logical address and the physical address by recording data of the same file on the continuous physical address LBA. In actuality, when an attention is paid to the fact that the probability is high that the same file is processed in a continuous manner, continuous block of the sequence key SQK is continuously written on the physical position on the CD-R disc with the result that the number of the extent EXTx itself which is an element constituting a management structure of the sequence manager SQM can be reduced. For example, when the extent EXTx is (0,0 56 5), the data (for example, two blocks) having the same sequence number (file) is continuously written, the extent EXTx (0,0 56 7) is provided with the result that the extent EXTx as the management data does not increase.

In FIG. 4, in an index node D constituting the intermediate node of B*tree (B star-tree), the sequence key SQK (key1, key2, key3, . . . ) of each head extent information EXTx of each of the corresponding leaf nodes E, F or G is stored together with the node number. When the sequence keys (key1, key2, key3, . . . ) are designated, the leaf nodes E, F or G corresponded by the node number are read out from the physical address LBA on the CD-R disc by referring to the node table (FIG. 5).

Consequently, when the sequence key SQK is designated, the sequence manager SQM searches the head key (sequence key SQM) in a range in which the sequence key SQK is included from the index node D. For example, when the target sequence key SQK is a value between the first sequence key key1 and the second sequence key key2 stored in the index node D, the sequence manager SQM selects the leaf node E starting from the extent EXT11 having the first sequence key SQK key1 so as to search the inside of the leaf node E sequentially. In this manner, a plurality of extent nodes EXTx in each of the leaf nodes E, F and G are arranged in the ascending order of the sequence number so that the physical address LBA of the data array designated by the desired sequence key SQK easily by using the method of B*tree (B star-tree).

Figure 5:
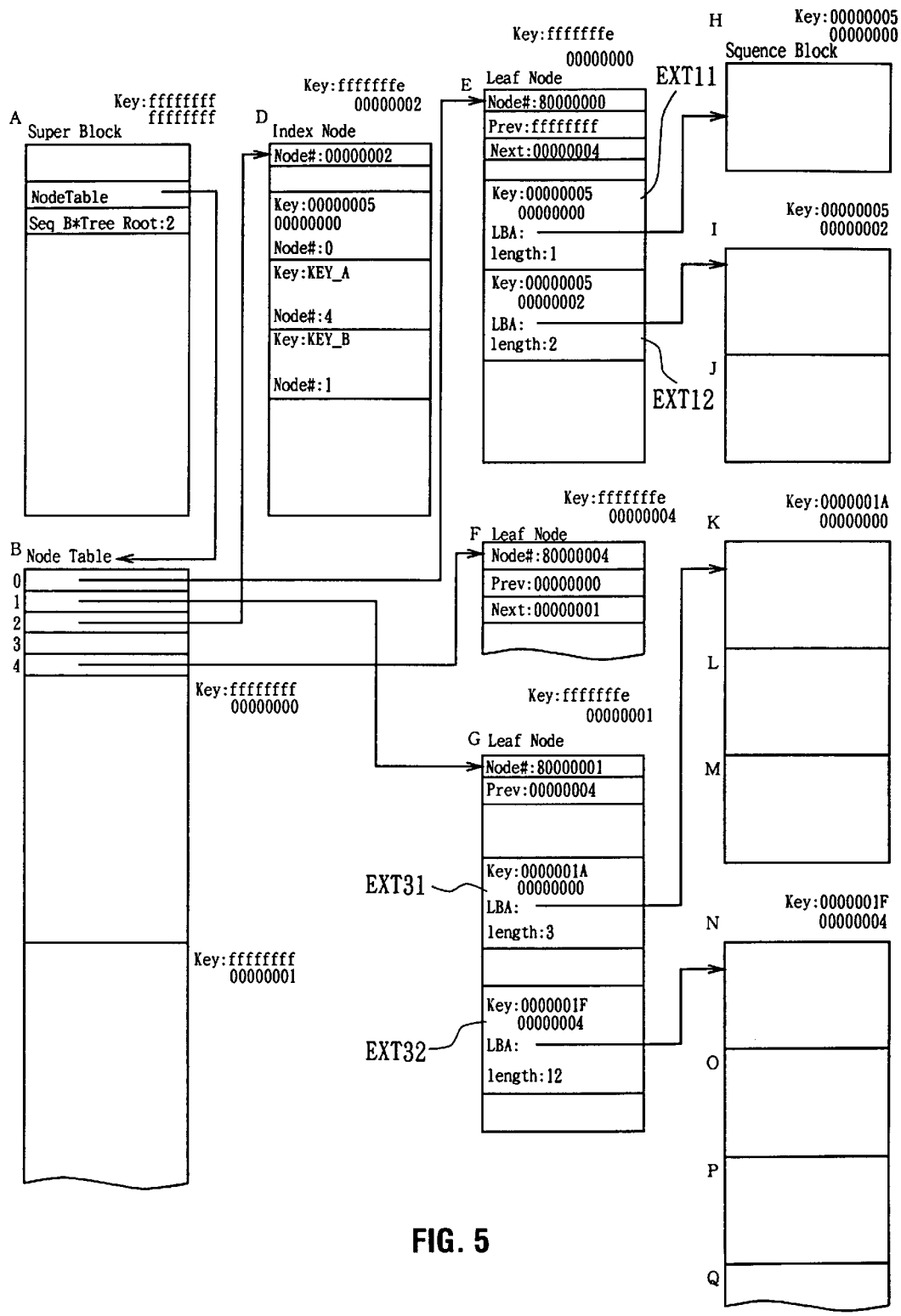
FIG. 5 is a schematic diagram explaining management structure by B*tree (B Star-tree).

For reference, FIG. 5 shows a searching method by means of the real B*tree (B star-tree) so that the physical address LBA (H, I, J, . . . ) on the target CD-R disc is searched from the super block (referred to as SVD) A, the node table (Node Table) B, the index node D and leaf nodes E, F and G which are recorded on the CD-R disc. In other words, the sequence manager SQM refers to the node table B on the CD-R disc on the basis of the physical address LBA on the node table B which is recorded in the super block. At the same time, the sequence manager SQM calculates the physical address LBA of the index node D from the node number of the node table B designated by the root node number which is recorded in the super block. As a consequence, the sequence manager SQM can refer to the index node D on the CD-R disc so that the node number corresponding to the desired sequence key SQK in the index node D, as described above with respect to FIG. 4. In this index node D, the node number corresponding to the sequence key SQK is read out so that the leaf nodes E, F and G corresponding to the node number read out the physical address LBA in the node table B. As a consequence, the target leaf nodes E, F and G can be read out from the CD-R disc so that the extent EXTx corresponding to the sequence key SQK designated at this time can be read out. With this extent EXTx, it is possible to obtain the position (H, I, J, . . . ) on the CD-R disc in the target data block line with this extent EXTx.

For reference, FIG. 6 shows an example of a correspondence relation between the sequence number and the physical address LBA. These four correspondence relations can be represented by one extent EXTx represented by the sequence number (123456781h), LBA (1000h), and the length. Each management data constituting B*tree (B star-tree) is recorded on the CD-R disc with the result that there arises a need of rewriting data along with the renewal of the content. Consequently, the correspondence table between the logical address and the physical address LBA and the management structure thereof are provided with respect to the data block constituting B*tree (B star-tree). In DCRFS, the 32 bit-long logical address referred to as the node number as mentioned in regard to FIG. 5 is attached to the block constituting B*tree (B star-tree) so as to manage the correspondence table between the logical address and the physical address as an array table in which the logical address is used as a subscript.

FIG. 7 shows an example of a node table which shows that B*tree (B star-tree) of the node number "0" is recorded on the position where the physical address LBA is located at a position of "30". Two data are attached in addition to the array table of the node table. In other words, the "number of entry" designates the number of elements in the arrangement whereas "free" shows the head of the used elements in the arrangement. The list of unused elements refers to the management mechanism of the unused element in the arrangement. With the mechanism, the reuse of the arrangement element can be simplified. The content of the last unused elements contains the subscript of the next unused element in place of the block address. In this example, table 2 is placed at the head of the unused element list followed by the following table 4 and table 1.

The node table is constituted so that a mechanism for managing the node table is omitted by recording the node table on a continuous area on the CD-R disc. In the case where B*tree (B star tree) is changed and the block constituting B*tree (B star tree) is rewritten, the renewed node table is written on the CD-R disc. For example, when the maximum number of the block number of B*tree (B star tree) required for managing one giga byte-long data becomes 8095 blocks as shown in FIG. 8 because it is favorable to consider that each extent EXTx refers to one block and only a half of each node is used. Since four bytes are required in the array table having the logical address as the subscript, the size of the table will be 16 blocks as shown in the following equation:

$$8095\ block \times 4\ byte + 2 \times 4\ byte = 32388\ byte = 15.8\ block \approx 16\ block \quad (1)$$

In the case where one giga space is managed, it can be seen that the continuous area required as a management table of B*tree (B star tree) is 16 blocks at most. In the CDRFS, a packet comprising 32 blocks is used as a recording unit for recording on the CD-R disc. The node table comprising 16 blocks at most is housed in one packet. Consequently, in the CDRFS this node table is housed together with other management information in the last packet which is written in the CD-R disc at the time of the flash operation which will be described later.

In this manner, in the CDRFS, the logical and physical address management mechanism of the data block has a dual structure comprising B*tree (B star tree) and the node table. The reason for constituting such a dual structure is that when only the logical and physical address management mechanism by means of a simple array table such as the node table is used, a large continuous area is required for the display. For example, when the case of the management of one giga space like the aforementioned example is considered, 1024 blocks of continuous area is required as shown in the following equation:

$$1 \times 2^{20} \text{ kbyte}/2 \text{ kbyte} \times 4/2048 \text{ kbyte} = 1024 \text{ block} \quad (2)$$

Furthermore, when an attempt is made to manage one giga space only with B*tree (B star tree), the node of B*tree (B star tree) is referred to with the physical address LBA with the result that the rewriting of the reference affects the node of other B*tree (B star tree) every time the node of B*tree (B star tree) is renewed. Consequently, in the CDRFS, the logical and physical address management mechanism has a dual structure comprising B*tree (B star tree) and the node table.

Thus, in the sequence manager SQM, when the physical address LBM having the sequence recorded is obtained from the searching method (B*tree (B star tree)) described above with respect to FIGS. 4 and 5, the physical address LBA is delivered to the cache manager CAM shown in FIG. 2 together with the sequence key SQK.

The cache manager CAM reads and writes data from the CD-R disc of the data block corresponding to the designated physical address LBA via a cache buffer referred to as cache block. In other words, the designated physical address LBA and the sequence key SQK are delivered to rewrite data, the cache manager CAM determines whether or not the data block represented by the designated physical address LBA is already present in the cache buffer. Here, when a negative result is obtained, the cache manager CAM reads data from the block (cache block) in the cache buffer, and stores the data in the block in the cache buffer so as to allocate the temporary physical address (Temporary LBA) to the housed data block. In this manner, the sequence manager SQM can access the data block without considering as to whether the position of the physical address is real or temporary by managing the address with the temporary physical address (Temporary LBA).

Furthermore, at this time, when the cache manager CAM memorizes the sequence key SQK (delivered from the sequence manager SQM) with respect to the data block to deliver the data pointer with respect to the cache block having the block data housed and the temporary physical address to the sequence manager SQM. The sequence manager SQM registers the correspondence relation between the temporary address (Temporary LBA) and the sequence key SQK in B*tree (B Star-tree).

At the same time, the data pointer of the cache block delivered from the cache manager CAM is delivered from the sequence manager SQM to the file manager FLM so that the data designated by the user is renewed. The data block which is rewritten in this manner is delivered to the cache manager CAM so that the block is managed as a renewed block which is called dirty block in the Write Cache Block which comprises a high speed memory. At this time, the dirty block is either renewed or created only in the cache buffer and is not yet recorded in the CD-R disc. Consequently when the dirty block reaches a predetermined number (32 blocks), the cache manager CAM writes the dirty block on the CD-R disc DISC via a device driver as one packet.

In the case where the same data block is renewed with respect to the data block again before the data is written on the CD-R disc by allowing the dirty block to remain in the write cache block until one packet portion of the dirty block is detained, only the data in the cache buffer (namely, writing of a new physical address LBA) is rewritten so that the renewal of data on the CD-R disc can be avoided.

The aforementioned explanation is concerned with a processing for rewriting the data block which exits already on the CD-R disc. The file manager FLM rewrites data while looking at only the temporary address by means of the temporary device manager IMM (FIG. 2). Consequently, even when a write once type CD-R disc is used as a recording medium, the file manager FIM can rewrite data in the temporary address space like an operation with respect to the rewritable media.

On the other hand, in the case where data block is newly generated, the sequence manager SQM requests the cache manager CAM to generate a block by delivering the sequence key SQM of the block to be generated. The cache manager CAM allocates the block in the cache and allocates a temporary physical address (Temporary LBA) to deliver the address to the sequence manager SQM. At this time, the sequence key SQK delivered to the cache manager CAM from the sequence manager SQM is memorized in the management table of the cache buffer in the cache manager CAM and the sequence key SQK is used at the time of the writing operation on the actual CD-R disc. The sequence manager registers the correspondence between the sequence key SQM of the block which is to be generated and the physical address brought back from the cache manager CAM in the management structure comprising B*tree (B star tree).

Furthermore, on the other hand, in the case where the data block is erased, the sequence manager SQM determines the physical address of the designated sequence key from B*tree (B star tree) to designate the ensure to the cache manager CAM. The cache manager CAM performs no processing when the block of the physical address LBA does not exist in the cache buffer. On the other hand, in the case where the block of the physical address LEA exists in the cache buffer, the cache manager CAM nullifies the cache block (namely, the block in the cache buffer managed by the cache manager CAM). Then, lastly, the sequence manager SQM erases the entry of the sequence key SQK to be erased from B*tree (B star tree) to complete the erasure thereof.

Here, an operation of writing data of the write cache block on the CD-R disc is referred to as a "flash". Firstly, when the sequence manager SQM receives the flash request from the file manager FLM, or secondly when the sequence manager SQM receives the writing request from the cache manager CAM, the flash operation is carried out.

In the first case, when the flash request is made and the CD-R disc is inserted from the application, the system is completed and the external factor constitutes a trigger of the CDRFS. On the other hand, in the second case, an internal factor constitutes a trigger thereof. When the reusable block does not satisfy the least number required for ensuring the operation, this is the case in which the operation of writing on the CD-R disc for ensuring the reliability in the CDRFS.

The case in which the number of reusable blocks in the cache does not satisfy the least number required for ensuring the operation of the CDRFS refers to a case in which the reusable blocks sufficient for writing, generating, renewing and eliminating of the sequence block which is a basic operation of the sequence manager SQM are not secured in the cache block. Consequently, when sufficient reusable blocks are not secured in the cache block, the reusable blocks are secured in the flash operation. Incidentally, the reusable blocks are a general name of write cache blocks (referred to as read cache blocks) obtained by writing the data of the write cache blocks on the CD-R disc and cache blocks (referred to as Free Cache Blocks) in which no effective data is stored.

Here, the number of reusable blocks which are required for the operation of the sequence manager SQM will be explained. In other words, when the sequence blocks are read, the target data blocks and the reusable blocks for storing B*tree (B star tree) management structure for examining the physical address where these blocks are present are required in the cache buffer. These B star tree blocks are not referred to at the same time at the time of the retrieval with the result that only one reusable block is present. Consequently, the maximum value RBCmax of the reusable blocks in the cache buffer required for the reading processing of the sequence blocks will be represented in the following equation:

$$RBCmax(N)=N+1 \quad (3)$$

wherein N represents the number of data blocks which are to be originally read.

At the time of the generation, renewal of the sequence blocks, unwritten blocks are assigned in the cache buffer. In actuality, since the sequence manager SQM renews B*tree (B star tree)s, data blocks for storing the node of B*tree (B star tree)s are generated and renewed so that the reusable blocks more than the number of the target blocks are required in the cache buffer. In addition, there is a possibility that the data block is generated along with the renewal of B*tree (B star tree) at the time of the erasure work. In this case, the reusable blocks are required.

Furthermore, at the time of the generation of the sequence block, the extent EXTx is generated and is inserted into B*tree (B star tree). When there is no allowance in the leaf node to which the extent EXTx is inserted, the leaf node is divided and one data block is generated for a new leaf node. Furthermore, when no allowance is generated in the index node to which the leaf node is inserted at the time of inserting into the index node the generated leaf node for the division, a new leaf node is generated for dividing the index node. In the case where depth of B*tree (B star tree) is 3, the total volume of data that can be managed can be represented in the following equation:

$$170 \times 170/2 \times 145/2 \times 2 = 2095250 \approx 2 \ [Gbyte] \quad (4)$$

in the state in which all the nodes other than the route are written by ½ in consideration of the least efficient state in which the number of blocks which one extent EXTx is managed is one. Consequently, in the CD-R disc when the volume is less than 700 megabytes, the route node of B*tree (B star tree) having the depth of 3 is not divided, the number of data blocks which is generated along with the insertion of the first extent EXTx into B*tree (B star tree) will be 2 at most.

Furthermore, since the index node immediately after the division is embedded up to 2/3 at most, it is required to newly insert 170/3 indices at least to fill the index nodes. Furthermore, when the adjacent index nodes are not filled, index nodes are moved to average the number of respective indices instead of division. Consequently, the least number of times of the insertion of the index nodes into B*tree (B star tree) which is required from the generation of the division of the index nodes until the next division will be 170/3×2=113. Furthermore, in the case of the leaf nodes, the insertion of at least 145/3×2=96 extents EXTx is required for generating the next division in the same manner. Thus the maximum value CBCmax of data block number generated by the call of one time block generation with respect to the sequence manager SQM will be represented by the following equation:

$$CBCmax\ (N)=N+2(N/96)/113+(N/96) \quad (5)$$

wherein N represents the number of data blocks which are to be originally renewed.

Figure 9A:
FIGS. 9(A) and 9(B) are schematic diagrams explaining how a data block is updated.
Figure 9B:

On the other hand, in the case of the renewal of the data blocks, the work is the same as the case of the block generation except for the work of removing the extent EXTx. In other words, in the case where one part of the extent EXTx is removed by managing the correspondence relation between the sequence key SQK of a plurality of consecutive blocks and the physical address LBA, the number of the extent EXTx will sometimes increase by one extent. For example, when the extent EXTx as shown in FIG. 9(A) is present, this extent will be exchanged by two extents as shown in FIG. 9(A) by removing the data block from the extent to renew the data blocks from the sequence keys "3" to "6". In this manner, when one part of the extent which is already present is removed, another one surplus extent may be present. In consideration of this fact, the maximum value MBCmax of the data block number generated by the one time call of the renewal of the blocks with respect to the sequence manager will be represented by the following equation:

$$MBCmax\ (N)=N+2+((N+1)/96)/113+((N+1)/96) \quad (6)$$

wherein N represents the number of data blocks which are to be originally renewed.

Furthermore, in the elimination of the data blocks, there is a possibility that the leaf nodes are divided when one part of the extent is eliminated. Consequently, the maximum value DBCmax of the data block number generated by the one time call of the elimination of the blocks with respect to the sequence manager SQM will be represented by the following equation irrespective of the number of data blocks to be eliminated;

$$DBCmax=2 \quad (7)$$

Furthermore, in the case where the data size to be treated in one time operation is not determined, it sometimes happen that a complicated calculation such as equations (3) through (7) is not sometimes required. For example, in the case of Windows 95 (trade name), when the allocation unit is read from the file system with [GetDiskInfo], an access can be made to the file system in the allocation unit. Consequently, when it is supposed that the allocation unit is set, for example, to 32 blocks, the number of data blocks which should be operated at one time with the sequence manager will be less than one packet. Thus the block number will be represented by the following equation;

$$DBCmax<CBCmax\ (32)=MBCmax\ (32)=34\ (block) \quad (8)$$

Before the operation of the sequence manager SQM, 34 reusable blocks may be present in the cache buffer.

Figure 10:
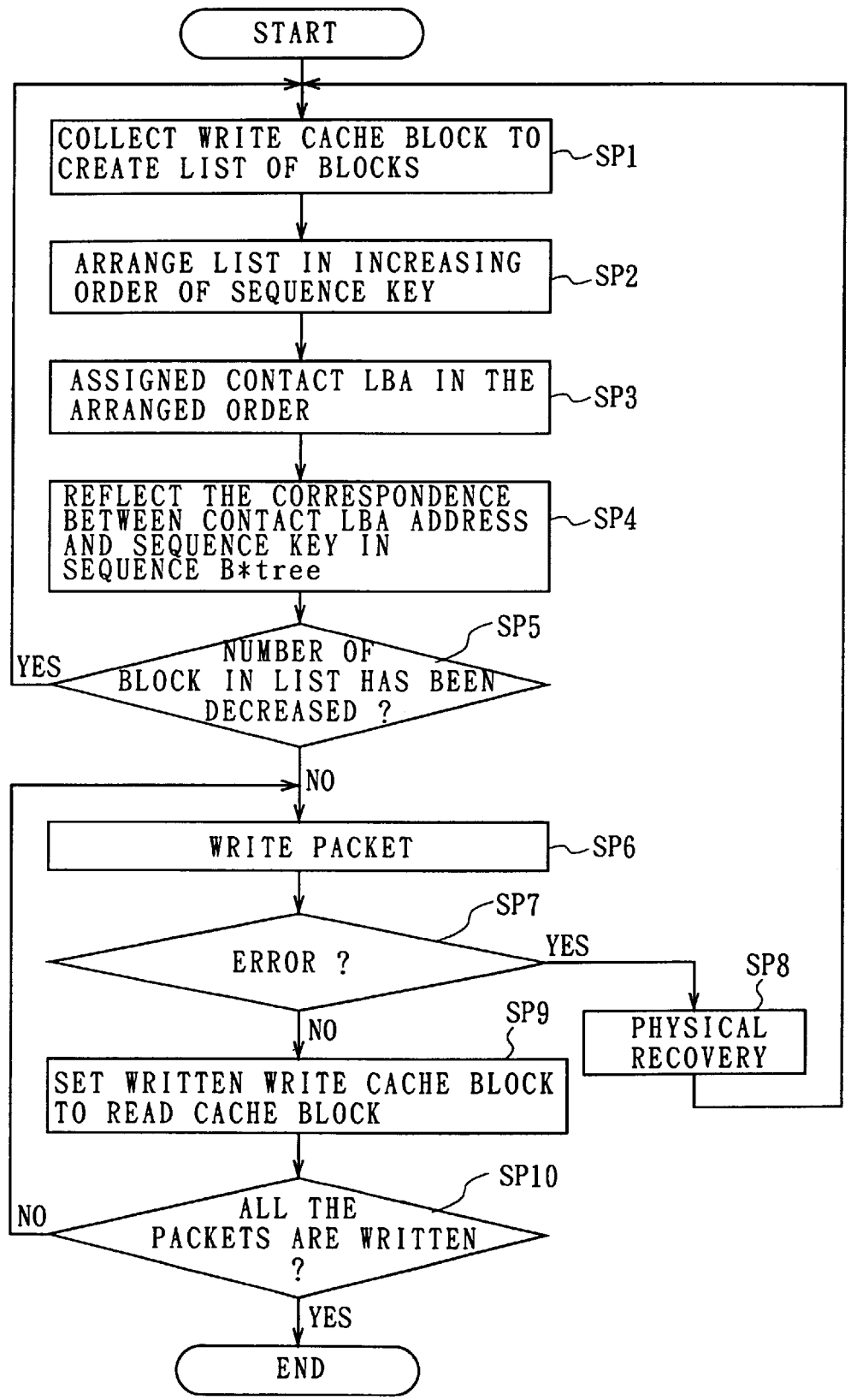
FIG. 10 is a table used for explaining the structure of a B*Tree index node.

A flash operation for writing the data in the write cache block on the CD-R disc DISC will be explained. As shown in FIG. 10, the sequence manager SQM requests the cache manager CAM to collect n packets of write cache blocks in the cache buffer. The number n of packets in this case depends on the setting of the cache manager CAM.

The cache manager CAM creates a list of blocks to be written on the CD-R disc DISC in accordance with a predetermined priority from among the write cache block in accordance with the request at step SP1 of FIG. 10. This priority is determined by using a so-called LRU (Least Recently Used) algorithm in which a priority is given to the block having less access to the target block with the result that cache out block (to be written on the CD-R disc) is determined in the order of higher priority. Here, when a vacancy is generated in the packet, the cache manager CAM assigns a dummy block to the vacant area.

The cache manager CAM refers to the cache management table at step SP2 with respect to the write cache block which is selected in this manner so that the block list of the write cache blocks are arranged in order so that the sequence key SQK is placed in order which corresponds to the write cache block. Then at the following step SP3, scheduled physical address (Contact LBA) on the CD-R disc where each block is written from the block list is assigned like the write start physical address LBA and the write start address LBA+1. This scheduled physical address (Contact LBA) will become an actual address (Real LBA) which is established on the CD-R disc when the writing is normally completed. When the writing is failed, the aforementioned temporary physical address will be provided.

Thus, at step SP3, a probability will become high that the block of the same sequence will be arranged on the continuous area on the CD-R disc by assigning the writing position to the order of the SQM in order with respect to each write cache block. As a consequence, the block can be continuously read from the CD-R disc at the time of reading with the result that the reading performance will be heightened. At the same time, an increase in the number of elements of B star tree can be prevented in which physical continuous block of the same sequence (files) are managed with one extent EXTx.

Thus, when the scheduled physical address (Contact LBA) is assigned to the write cache block at step SP3, the sequence manager SQM receives a correspondence table of the sequence key SQK and the scheduled physical address (Contact LBA) assigned from the cache manager CAM so that B*tree (B star tree) is renewed at step SP4. In other words, at step SP4, the temporary physical address (Temporary LBA) of the extent EXTx created by assigning the temporary physical address at the time of the data renewal in advance is replaced with the scheduled physical address (Contact LBA; Temporary Actual address). The scheduled physical address (Contact LBA) is assigned with the sequence key SQK in order so that some extent EXTx is summarized by the execution of a plurality of such renewal thereby reducing the number of the extent EXTx of B*tree (B star tree) as a whole. As a consequence, in some cases, a part of the nodes (leaf nodes and intermediate nodes) which constitute B*tree (B star tree) will be eliminated. Consequently, at step SP5, the sequence manager SQM judges whether or not the number of blocks which constitute B*tree (B star tree) has been decreased or not. When an affirmative result is obtained here, this represents that write cache blocks having a low priority which are not selected by the LRU (Least Recently Used) algorithm at the aforementioned step SP1 in place of the decreased block can be included. At this time, the sequence manager SQM returns to the aforementioned step SP1 to repeat the selection of the write cache block again.

Thus, by repeating the processing at steps SP1 through SP5 a negative result will be obtained at step SP5. The cache manager CAM moves to step SP6 to send the packet data comprising a plurality of blocks collected in the write cache buffer to the CD-R disc via a device driver with the result that the data is written on the CD-R disc in a new writing area in the packet unit.

Here, an writing error to the CD-R disc is generated, an affirmative result is obtained at the subsequent step SP7. At this time, the sequence manager SQM and the cache manager CAM moves to step SP8 to perform a physical restoration to the CD-R disc. In other words, in the CD-R disc device, it is stipulated in the specification that the data is written in the packet unit. It becomes necessary to embed the packet with dummy data with respect to the packet in which a writing error is generated and the record data is interrupted.

Consequently, the sequence manager SQM and the cache manager CAM restores incomplete packets with dummy data and record again data that should be recorded as the packet with the dummy data. At this time, the physical address LBA of the data to be written is changed so that the sequence manager SQM and the cache CAM manager returns to the aforementioned step SP1 where the data of the unwritten write cache block is collected again and a new scheduled physical address (Contact LBA) is assigned to the new scheduled physical address (Contact LBA). Incidentally, with respect to the packet where the writing is completed before the error generation the data included in the packet is already changed into a unrenewed data block called read cache block in the cache buffer so that the data block does not become an object to be recollected by the write cache block after step S8. Consequently, every time the packet writing is succeeded, the data scheduled to be written (write cache block) decreases so that all the data blocks will be finally written on the CD-R disc.

Thus, at step SP7, the cache manager CAM change the write cache block corresponding to the cache buffer into a read cache block with respect to the packet in which a negative result is obtained (packet in which writing has been succeeded). At the following step SP10, the processing at steps SP6 through SP9 is repeated until the result having all the packet written is obtained.

Here, FIG. 11 shows a recording state of the data onto the CD-R disc. In the multi-session packet recording method, a plurality of sessions (Session 1, Session 2, . . . ) are subsequently recorded from the inner periphery to the external periphery on the CD-R disc in a spiral manner. On the inside of the recording area, a power calibration area (PCA) and a program memory area (PMA) are secured so that information for power adjustment and management information in each session can be recorded.

Each session comprises a program area in which block data of the sequence (file) created and renewed by the user, and a lead-in area in which lead-in information representative of the start of the session and lead-out information representative of the end of the session is recorded. Incidentally, the lead-in information and the lead-out information is to be recorded after one session portion of the file data is recorded in the program area. The information is intended to have compatibility with the CD-ROM.

As shown in FIG. 11(B), the program area is further divided. In the case of the 3 data track, the program area is divided into three tracks. At this time, the head of each track is provided with an index area (Index) and index information of the track is recorded on this part. Further, as shown in FIG. 11(C), the track comprises a collection of packet which constitutes a basic unit of data writing. As shown in FIG. 11(D), this packet is divided into four parts, a link block, a run in block, a user data block having user data such as file information or the like and a run out block.

Here, as data to be recorded on the program area shown in FIG. 11(A), information showing a data management structure is present in addition to the block data (user data) of the sequence (file) created by the user. As this information, there is available a primary volume descriptor (PVD), a super block, a node table, a B star tree index node, a sequence B star tree index node, and a sequence B star tree leaf node. Incidentally, all the data management structure excluding the node table has a size of one block (2048 bytes) and is recorded in the block boundary. Furthermore, the node table is a variable length data structure having a size of one block or more and the head of the node table starts from the block boundary.

The primary volume descriptor PVD is information which is recorded on the 16th block from the head of the session. At the head 1152 bytes of the 16th block, one which is the same as the 1SO9660 PVD is recorded and information peculiar to CDRFS shown in FIG. 11 is contained. In the PVD of FIG. 12, the Super Block Search Method shows a position where the most recent super block is stored. In other words, the super block is constituted so as to be written on the CD-R disc every time the flash all operation is performed. With the Super Block Search Method of the PVD, the latest position can be detected.

For example, in the case of "Search Method=0", it is shown that the super block is recorded on the block represented by the "Super Block LBA". Furthermore, in the case of the Search Method=1, it is shown that the super block is represented in the "Last Accessible Block". Furthermore, in the case of the "Search Method=2", it is shown that the "Super Block Serial Number" is recorded at the maximum position out of the super blocks recorded on the Super Block Area. Incidentally, "Super Block Area" refers to the total blocks sandwiched between the block represented by the Start LBA of Super Block Area and a block represented by the End LBA of Super Block Area.

Furthermore, when the "File System Flag" shown in the PVD of FIG. 12 is 0x0001, it is shown that "Addressing Method 11" is used. Furthermore, when "the File System Flag" shown in the PVD of FIG. 12 is 0x0002, it is shown that the "ISO9660 Volume" is hidden so as not to be seen from the CDRFS. Furthermore when the "File System Flag" shown in the PVD of FIG. 12 is "0x0003", it is shown that the first track of the session is recorded with TAO (Track At Once) or a variable length packet.

Furthermore, the Packet Size shown in the PVD of FIG. 12 shows the block number of the user data in the fixed length packet. However, this field is effective only when the "Addressing Method II" is used.

Furthermore, the "Volume Capacity" shown in the PVD of FIG. 12 shows the total number of blocks which can be recorded on the CD-R disc after the format. Incidentally, this value is a reference value which is used at the time of returning the information on the total volume of the CD-R disc with respect to the operation system.

Furthermore, FIG. 13 shows a structure of the super block. For example, information representing that the block is a super block is recorded on the first "Super Block Header". In the case of the "Search Method=1", when the Super Block is not recorded on the "Least Accessible Block", an old "Super Block" is searched on the basis of this Super Block Header.

Furthermore, the "Super Block Flags" represents whether or not data effective for the session is recorded or not. "Node Table LBA" shows the block in which the node table is recorded. When the size of the node table is two blocks or more, "Node Table LBA" is sequentially recorded from the block represented by the Node Table LBA. Furthermore, the "Previous Super Block" shows the position of the Super Block which has been previously recorded. In the case of the CD-R disc, the data which has been previously recorded will not be lost from the disc. Consequently, it is possible to know the state of the past volume by keeping track of the "Previous Super Block".

The "Sequence B star tree Root Node Number" shows the node number of the management structure (Sequence S Star Tree) comprising the aforementioned B Star Tree with respect to FIG. 5. In addition, the "Directory B Star Tree Root Node Number" shows the node number of the node of the Directory B Star Tree managed by the File Manager FIM. The "Serial Number" refers to a sequential number of the super block. Incidentally, the "Serial Number" of the super block generated at the time of the format is "0".

Furthermore, the "Super Block List" is a table in which 50 Previous Super Blocks LBA" are collected in the past. The "Super Block List" comprises a repetition of Super Block List Entry as shown in FIG. 14. The first entry of the Super Block List shows the super block one block before the super block in which the Super Block List is housed. When the number of the past Super Block is less than 50, the entry is filled from the bead thereof and the unused entry is filled with "0".

The "Super Block Tag List" is a table of the name label of the past super block. The "Super Block Tag List" comprises a repetition of a tag entry as shown in FIG. 15. In this CDRFS, 24 tags at most can be attached to one CD-R disc. At this time, when the tag is less than 24, the entry is filled from the head and the unused entry is filled with "0".

Furthermore, the Node Table refers to a correspondence table between the node number of each node of the management table (Sequence B Star Tree) comprising the B Star Tree) and the physical address thereof as described above in FIG. 5. The Node Table has a structure as shown in FIG. 16. This Node Table is recorded sequentially from the head of the data block. When the Node Table cannot be housed in one data block, a sequel to the next data block is recorded.

Furthermore, the index node is a node other than the leaf node of the management structure comprising the B Star Tree. Information shown in FIG. 17 is recorded in the index node. The "Number of Record" shown in FIG. 17 shows the number of index records housed in the leaf node. Incidentally, this index record has a structure shown in FIG. 18, and the index record is sorted in the ascending order of the key and is filled from the "Index Record [0]" in order to be recorded.

In addition, the sequence B Star Tree Leaf Node refers to the node of the B Star Tree for housing the correspondence relation between the sequence key SQM and the physical address LBA, and the Sequence B Star Tree Leaf Node has a structure as shown in FIG. 19. The extent EXTx in this leaf node has a structure shown in FIG. 20, and is sorted in an ascending order to be filled from the Extent Record [0] to be recorded. Incidentally, the number of the extents EXTx in the node is recorded in the Number of Records.

Figures 21, 22, 23:
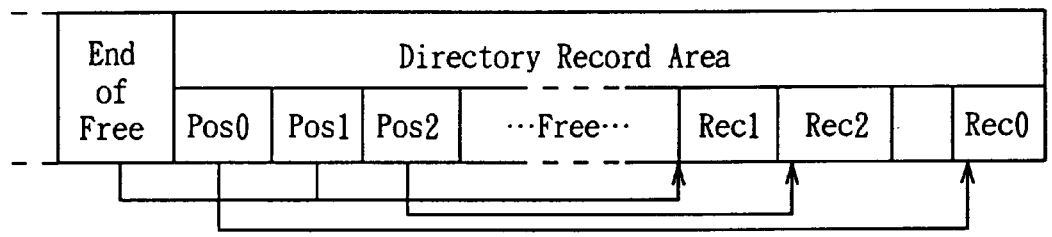
FIG. 21 is a schematic diagram showing the structure of a directory B*Tree (B Star-tree) leaf node.
FIG. 22 is a schematic diagram showing the structure of directory record area.
FIG. 23 is a schematic diagram showing the structure of directory record.

Furthermore, the Directory B Star Tree Leaf Node h is the node of the B Star Tree for housing the file name, the sequence key SQK, a correspondence relation between the directory name and the directory number, and attribute information of the file and the directory, and has a structure shown in FIG. 21. In the "Node Number" in this leaf node, the "Node Number" of the leaf node added with [0x80000000] is housed. The "Number of Records" shows the number of directory records housed in this leaf node. "Previous Node Number" and "Next Node Number" show the Node Number of the leaf node having the least key and the leaf node having the largest key. When no target node exists, [0xffffffff] is recorded. In the Total Size of Record, the total byte number of the Index Records Offset and the directory record is recorded.

The Directory Record Area is used as shown in FIG. 22. "PosX" is referred to as "Index Record Offset", and shows the position where the directory record is recorded is shown with the byte offset from the head of the directory record area. Incidentally, this "PosX" is one byte. Incidentally, the PosX is sorted in the order of the key held by the directory record shown by the PosX. The PosX is filled from the head and is recorded.

"RecX" is a main body of the directory record. The position is not particularly limited. However, when the algorithm adopted in the CDRFS is used, the directory record which has been recently created as a result of the processing is housed at a position most adjacent to the head of the directory area. When the value housed in the "Number of Records" is set to "Nrj", an area between "PosNr-1" and "PosNr-2" is an unused area. This area is used for the renewal and the preparation of the directory record. Incidentally, the unused area is used from the head, and the unused area is from the rear in "RecX".

The directory record refers to the correspondence relation between the file name, the sequence key SQK, the directory name and the directory number, and a variable length data for housing the attribute information of the file and the directory. The directory record has a structure shown in FIG. 23. Incidentally, the directory record is recorded on the directory record area described above. The key in the directory record is assigned to the directory record, and the key is constituted as shown in FIG. 4.

In FIG. 24, the directory number is a number peculiarly attached to each of the directory. All the directory in the same directory has the same directory number. "Hashed Key" refers to a residual obtained when the name of the directory record is divided by the generating function shown by the following equation;

$$P(x)=X^{16}+X^{12}+X^5+1 \quad (9)$$

This "Hashed Key" becomes the same value with respect to the different name. To avoid this, "Sequential Number" is used in the CDRFS. In the case where the directory record having an equal directory number and an equal "Hashed Key" despite the name different from the directory record which is to be inserted already exists in the B Star Tree, the CDRFS sets to the Sequential Number of the directory record a number obtained by adding 1 to the "Sequential Number" of the directory record which is already present in the B Star Tree.

Furthermore, the size shows a byte number of the directory record including the key and the size itself. Furthermore, the type is a field for showing the type of the directory record. There are five kinds as shown in FIG. 25. Furthermore, apart from this, it is shown that when the bit 7 of the type is erected, the directory record is referred to from one or more Hard Link Directory Record.

Incidentally, structures of the File Directory Record, the Directory Record and the Link Directory Record are shown in FIGS. 26 through 28.

Data (management information) comprising such B Star Tree is written in the user data area (FIG. 11) together with the file data (user data) at the time of writing operation called flash all. In other words, the super block contains the physical address LBA of the block housing the node table, and the route node number of the management structure (FIG. 5) comprising the B Star Tree, and is constituted so that the link to all the data on the CD-R disc excluding the PVD begins with the super block until reaching the file content from the management information. Furthermore, as described above with respect to FIG. 5, the node table is required to refer to the node of the management structure comprising the B Star Tree. Consequently, the Super Block constituting such management structure is written at the time of the flash all operation to the last block one block before the next time writing position of the user area. The timing at which the flash all is carried out is when the predetermined time which is set has elapsed, and more than the predetermined amount of data is written on the CD-R disc. As a consequence, management information (super block) is written on the CD-R disc in a predetermined interval.

Figure 29:
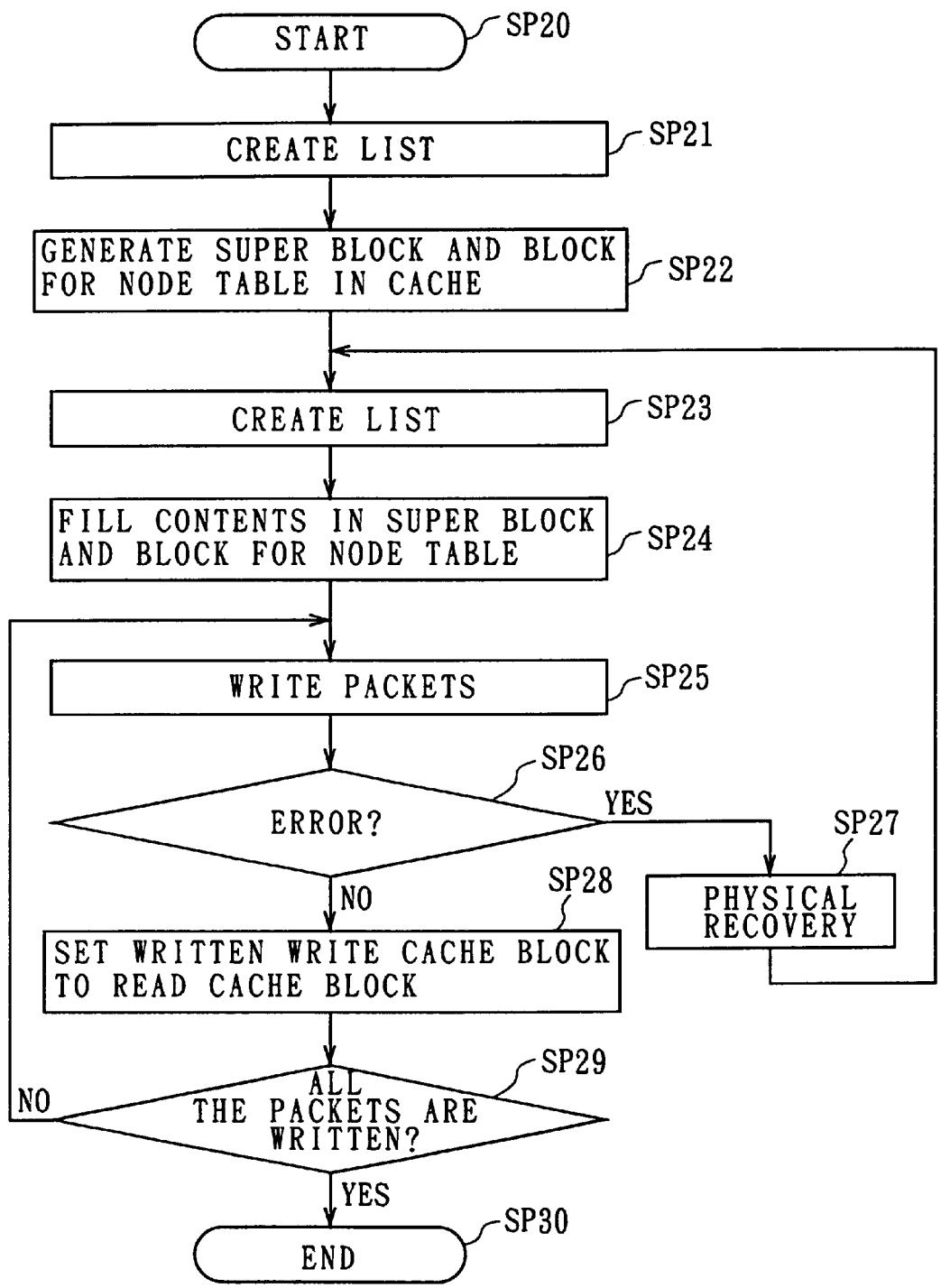
FIG. 29 is a flowchart showing flash all operation.

FIG. 29 shows an operation procedure of the flash all. The sequence manager SQM and the cache manager CAM enters into the processing procedure from step SP20. At step SP21, a list is created in the same manner as the case of the flash operation described above in FIG. 10 with respect to the write cache block in the case buffer. In other words, the sequence manager SQM demands the cache manager CAM to collect all the write cache blocks in the cache buffer. After the cache manager CAM creates a list of all the unwritten cache blocks and dummy blocks as required, the cache management table is referred to arrange so that the sequence key SQK is put in an ascending order. The scheduled physical address (Contact LBA) is assigned in an order such as the physical address LBA with which the writing is started from the head block of the list thus arranged, and the physical address LBA+1 with which the writing begins.

The sequence manager SQM renews the B Star Tree on the basis of the sequence key SQK and the physical address. The processing up this step is repeated until the block elimination is generated by the renewal of the B Star Tree. Next, at step SP22, the sequence manager SQM demands the cache manager CAM to generate the data block for housing the node block and the super block in the same procedure as the normal block generation. As a consequence, the cache manager CAM generates the super block and the block for the node table in the cache buffer.

Here, for the generation of the block of the node table, "ffffffff00000000(hex)", "ffffffff00000001(hex)" . . . are delivered, and for the generation of the super block, "ffffffffffffffff(hex)" is delivered as the sequence key SQM. In this manner, by attaching the sequence key SQK the node table, the node table is arranged in a continuous area at the time of the block arrangement operation, and the super block is arranged in the last block of the last packet.

Subsequently, the cache manager CAM creates a list again with respect to the write cache block at step SP23. In other words, the sequence manager SQM demands the cache manager CAM to collect all the write cache blocks in the cache buffer. When there is a data block which is not sent before, the data block is collected again. After a series of processing is performed as usual such as the preparation of the block list by the cache manager, the determination of the physical address LBA and the renewal of the B Star Tree by the cache manager CAM, each content is filled in the super block and the block for the node table at step SP24.

After this, the data is actually recorded in the packet unit after preceding to the step SP25. After the data is all written, the process proceeds to step SP30 thereby ending the flash all operation. Incidentally, since steps SP25 through SP29 are the same as steps SP6 through SP10, explanation thereof is omitted.

In this manner, in the flash all operation, the largest value such as [ffffffffffffffff(hex)] is assigned to the super blocks as the sequence key. On the other hand, such large and continuous values as [ffffffff00000000(hex)], [ffffffff00000001 (hex)] and . . . are assigned to the node table as the sequence key. Furthermore, continuous values such as [ffffffe00000000 (hex)], [ffffffe00000001(hex)] and apparently different from the node table are assigned to the leaf node as the sequence key SQM.

These values are extremely large compared with the sequence key SQM [0000000500000000(hex)], [0000000500000002 (hex), . . . ) which are assigned to the block data (user data) constituting a sequence (file) other than the super block, the node table and the leaf node. Consequently, when the flash operation is carried out with the sequence block assigned in this manner, the user data and the management information (super block, node table and the leaf node) is block sorted (rearranged) so that the sequence key SQK is arranged in an ascending order. Thus, the user data and the management information is sequentially recorded on the CD-R disc in the sorting order. As a consequence, management information such as super block, the node table, the leaf node and the like to which large sequence key SQM is assigned are written on the last block of the last packet.

Figure 30A:
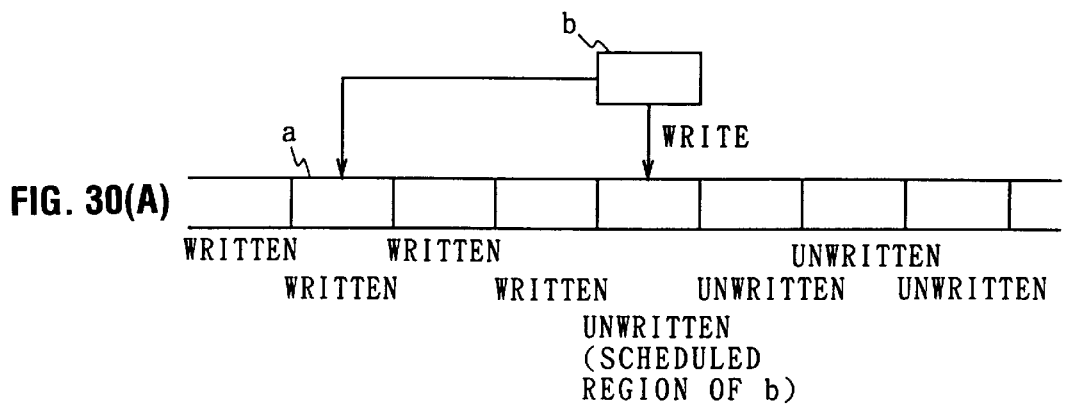
FIGS. 30(A) to 30(C) are schematic diagrams explaining the rewriting operation.
Figure 30B:
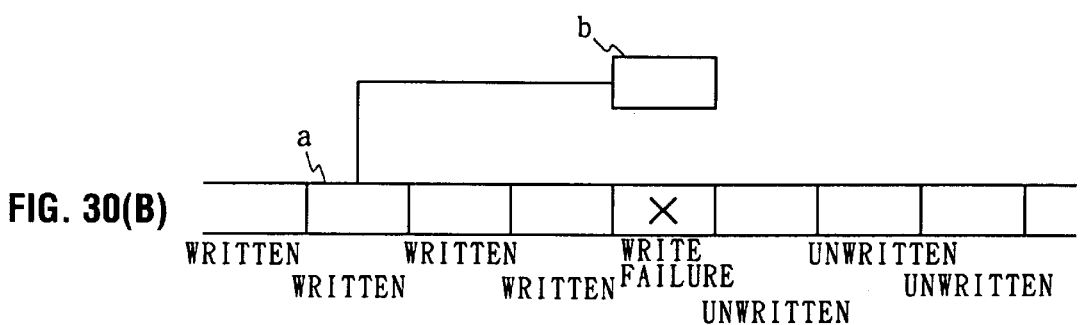
Figure 30C:
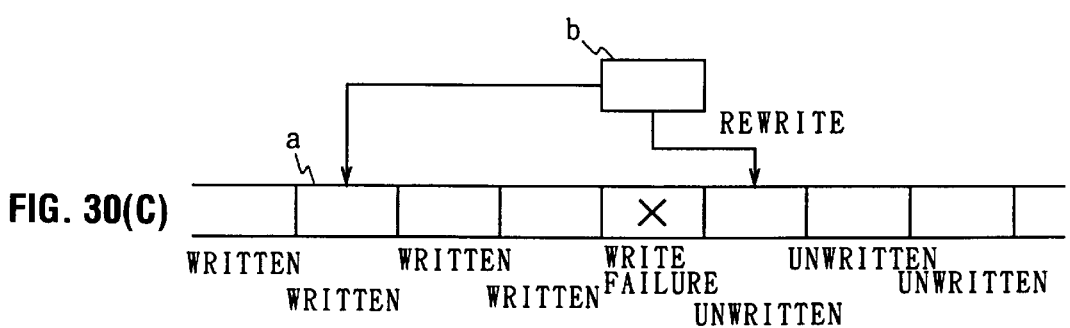

In this manner, a reference relation is established only in a direction from the block which is written on the CD-R disc later toward the block which is written on the CD-R disc earlier. Consequently, as shown in FIG. 30(A), when an attempt is made to write data in the packet unit sequentially from the left (the CD-R disc on the inner circumference) to the right (CD-R disc on the outer circumference), a reference relation is established only in one direction so that the packet datab (for example, the super block) which are about to be written on a new unwritten area refers to the packet data a (for example, node table) which is written on the forward part of the physical address. As a consequence, in the case where the packet data b is failed to be written as shown in FIG. 30(B), only the packet data b which has failed to be written may be rewritten as shown in FIG. 30(C). As a consequence, in the case where it is so constituted that the forward packet data a refers to the backward packet data b, a rewriting operation can be easily performed at the time of error occurrence as compared with the case in which it is necessary to rewrite the physical address information of the backward packet data b in the forward packet data a in accordance with the change in the writing position of the backward packet data b (to write the forward packet data a in a new unwritten area together with the backward packet data b in the case of the CD-R).

Furthermore, in the CDRFS, the flash operation is carried out without fail at the time of taking out the CD-R disc from the CD-R driver 5 so that the super block is written on the last packet. Consequently, when the CD-R disc is inserted into the CD-R drive again, the CDRFS retries the super block from the outermost circumference. On the basis of the management information of the super block described above with respect to FIG. 5, data written on the forward part (inner circumference side) of the super block is referred to. At this time, when the super block is failed to be written on the last packet, the CDRFS searches a super block one block before toward the inner circumference sequentially from the super block. In this case, it becomes difficult to access the user data which is written on the super block after the super block one block before. Consequently, with the CDRFS of the invention, the flash all operation at the time of writing data on the CD-R disc is carried out when a predetermined time has elapsed and an amount of data which exceeds the predetermined amount is written from the cache manager CAM to the CD-R disc. As a result, the super block is written on the CD-R disc relatively frequently with the result that even in the case where the super block which should exist on the last packet fails to be written on the last packet, it becomes possible to avoid the loss of a large amount of user data by reading the super block one block before which is written relatively near to the target super block.

The CDRFS which operates as described above stores file information such as file name for each file in the storage area corresponding to the file when generating the file. Incidentally the file entry is dealt with as the file managed at the aforementioned CDRFS. As shown in FIG. 31, the file entry has an area for recording the size of file entry, a key management area for recording the information on key referred to as "key", and an area referred to as Object Name Area for managing file name.

In the key management area, Directory Number, search key CRC (Cyclic Redundancy Check Code), and District Number are recorded. In the Object Name Area, the file name designated under the operating system OS which comes under when the file is generated, the information for managing the file name, and length of the file name, etc., are stored.

The file name written on the CD-R disc DISC as a file entry is converted to the file name to which a plurality of operating systems can accessed. Consequently, in the case where the file written in the CD-R disc DISC is accessed through each operating system OS, the CDRFS converts the file name read out from the CD-R disc DISC to the file name recognizable by the operating system OS used at accessing. Thus the operating system OS presently being used can recognize the file name on the CD-R disc DISC within the language environment.

Figure 32:
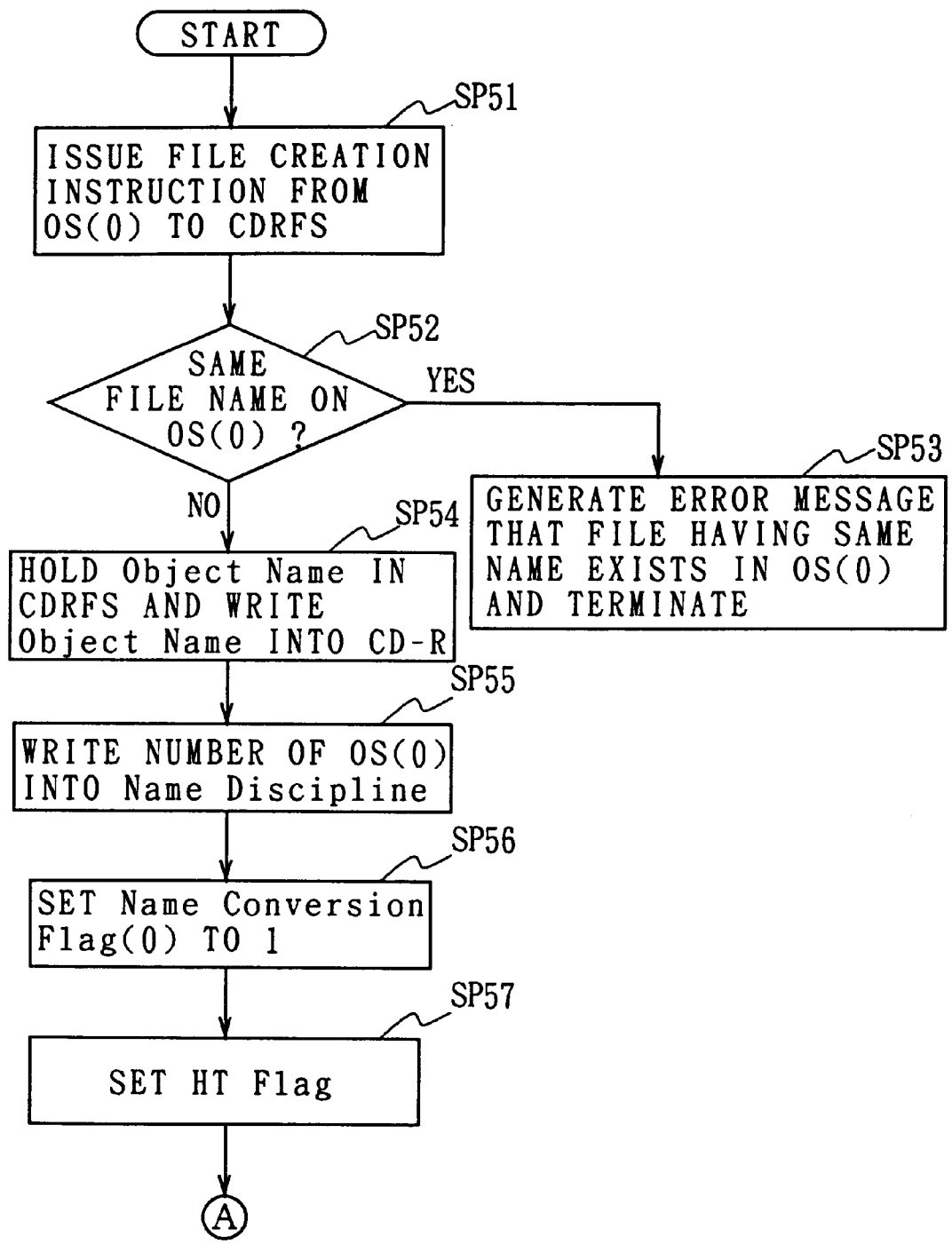
FIG. 32 is a flowchart showing the determination procedure of the file name conversion method.
Figure 33:
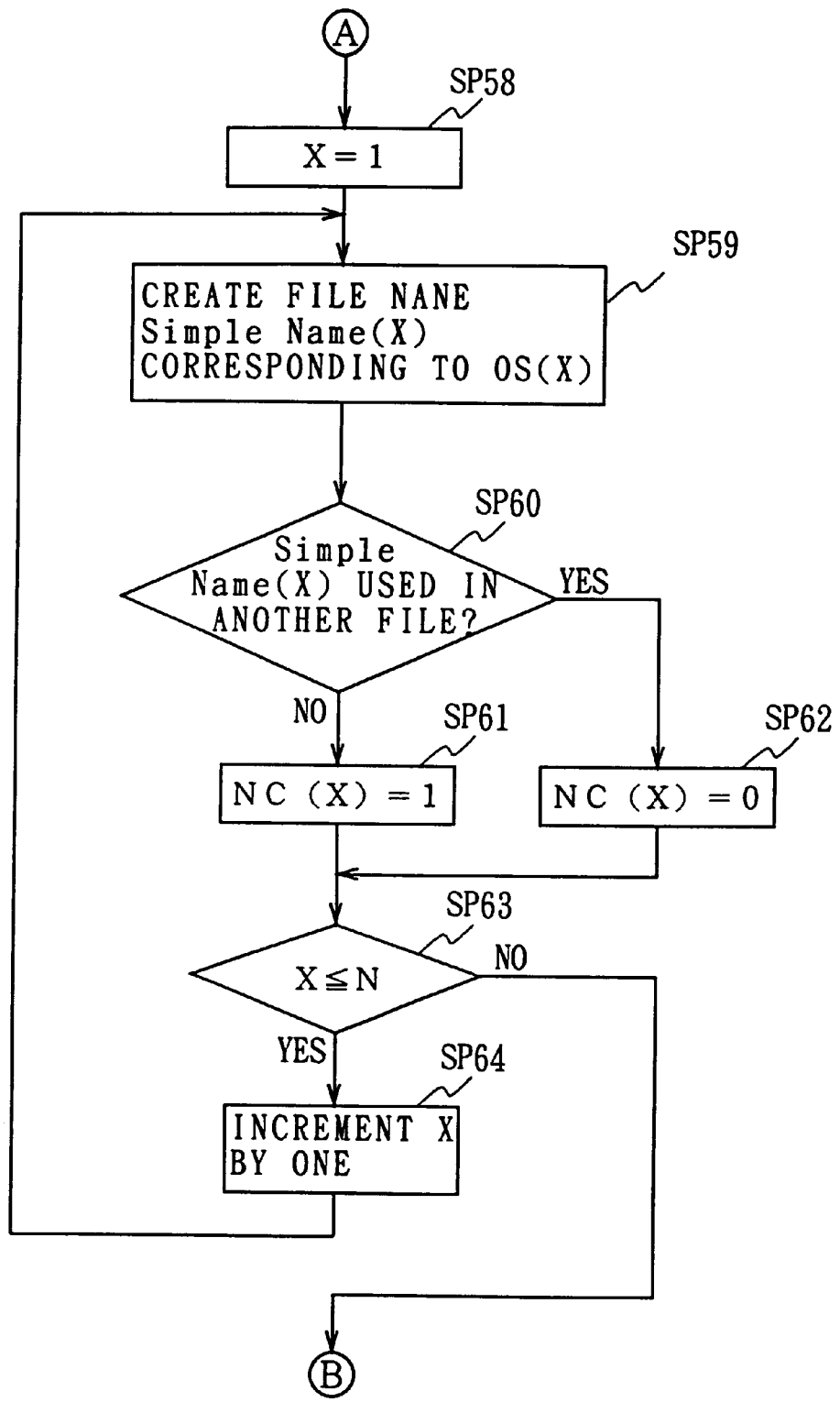
FIG. 33 is a flowchart showing the determination procedure of the file name conversion method.
Figure 34:
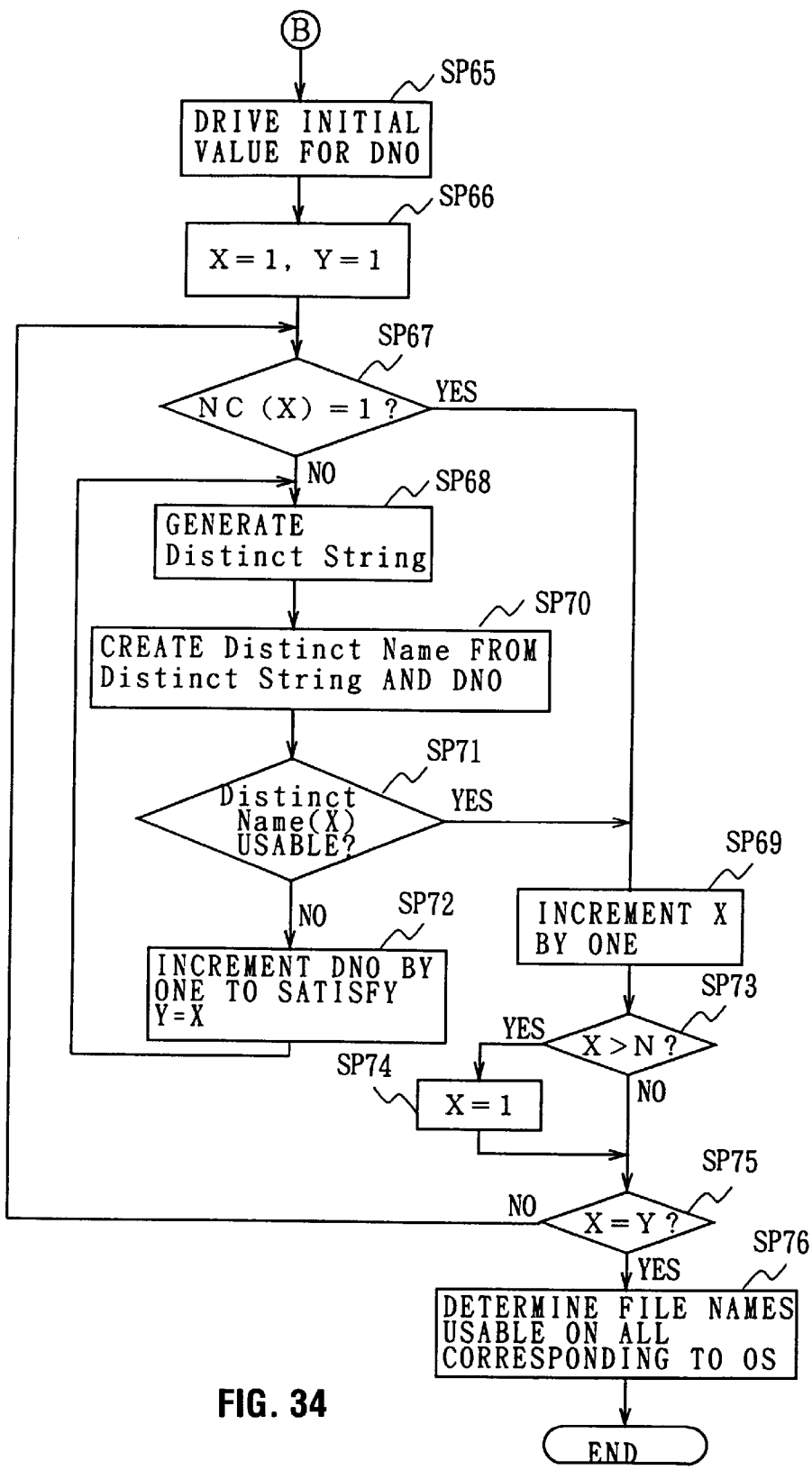
FIG. 34 is a flowchart showing the determination procedure of the file name conversion method.

Here, the describe will be made of the case where a new file name which can be accessed through a plurality of operating systems OS(0) to OS(N) registered in the CDRFS is created in accordance with a file name conversion procedure as shown in FIGS. 32 to 34. In addition, OS(X) represents the operating system OS other than OS(0).

At first, when a command for preparing the file on the CD-R disc DISC is issued via an application software AP, the operating system OS(0) start processing the procedure as shown in FIG. 32. At step SP51, the operating system OS(0) issues the command for preparing the file by using the designated desired file name. Here, the CDRFS reads the file entry already written in the CD-R disc DISC on the RAM 7 (FIG. 1). At step SP52, the operating system OS(0) retrieves whether or not there exists the file having same file name as designated under the operating system OS(0) in the file entry on the RAM 7 (FIG. 31) throughout all the files on the CD-R disc DISC. Incidentally, the file entry is read out from the CD-R disc DISC if necessary and expanded on the RAM 7 under the control of the CDRFS.

As the retrieving method, the CDRFS converts the file name designated under the operating system OS(0) to the search key CRC at aforementioned step SP51. In this case, the file name is converted in accordance with the predetermined retrieve key conversion method and then top four characters of the converted file name are picked up. Then, character codes representing top four characters are divided by a predetermined number, so that the search key CRC can be obtained. In this manner, in the operating system (MS-DOS) in which fewest character number for a file name is set, if the latter four characters out of top eight characters in the file name comprising eight characters+three characters (extension) are replaced with the following Distinct Number, the remaining top four characters can be used for retrieving by the search key CRC. In this manner, when the search key CRC having the file name designated under the operating system OS(0) is obtained, the CDRFS also converts the top four characters of all file names written on the CD-R disc DISC out of the file entry to the search key CRC and compares them with the search key CRC of the file name to be created which is designated under the operating system OS(0).

In this manner, one of the file name at least whose search key CRC is corresponds with the search key CRC of the file name designated under the operating system OS(0) is retrieved out of the file name already written on the CD-R disc DISC.

If there exists the one whose search key CRC corresponds, the CDRFS converts the file name whose search key CRC corresponds to the file name readable under the operating system OS(0). More specifically, on the CD-R disc DISC, there may exist the file name created another operating systems OS(1) to OS(N), which makes it difficult for the operating system OS(0) presently being used to read the file name as it is. Thus the CDRFS converts (conversion of the number and type of the characters) file name whose search key CRC corresponds out of the file names of the file entry which are read from the CD-R disc DISC on the RAM 7 to the file name readable by the operating system OS(0) presently being used.

The file name converted in such manner is compared with the file name designated under the operating system OS(0) at aforementioned step SP51. This enables the CDRFS to determine whether or not there exists the corresponding file name through the operating system OS(0).

If there has already existed the file name same as the one to be created in the converted file names which can see under the operating system OS(0) as the result of the retrieving at step SP52, the CDRFS proceeds to step SP53 so as to inform the operating system OS(0) of the existence of the same file name by delivering the pointer. Then the CDRFS executes such error process as error display on aforementioned display unit 2 so as to terminate the file name conversion procedures.

Further, if there cannot be found same file name in the file entry as the file name designated at aforementioned step SP51 through the operating system OS(0), the CDRFS proceeds to step SP54 so as to write the file name designated at the operating system OS(0) in storing area in the file entry as Object Name with no change and also write the Object Name in the CD-R disc DISC if necessary. Incidentally, the CDRFS executes the file management normally in the virtual address space extended on the cache buffer (the RAM 7). Also, in the file name conversion process, the write-in/read out process of the file name is executed to the virtual address space on the cache buffer. If the residual quantity in the cache buffer is reduced or the CD-R disc DISC is took out from the CD-R drive 5 (FIG. 1), the data in the cache buffer (the file entry, the file management data, etc.) is written in the CD-R disc DISC.

Next, the CDRFS proceeds to step SP55 so as to write the number of the operating system OS(0) presently being used in the storing area referred to as Name Discipline provided in the Object Name Area. Thus the type of operating system OS(0) by which the Object Name written in the file entry is generated is corresponded with the Object Name and managed on the file entry.

Further, the CDRFS proceeds to step SP56 so as to set Name Conversion Flag provided in Object Name Area of the file entry (FIG. 31) as "1". When the new file name to be created under the operating system OS(X) (=OS(0)) presently being used is converted to the form (Simple Name (X)) readable by each operating system OS(1) to OS(N), the name conversion flag decides the necessity of further conversion (namely, whether or not the same file name exists through each operating system (OS(X)). If it is necessary, the same conversion flag is set as "0"; if it is not necessary, the same conversion flag is set as "1". In this manner, the name conversion flag is set as "0" when it is necessary. Thus when the access to the CD-R disc DISC is done through a new operating system OS which has not installed, the flag is set as "0" as the initial status of the new operating system OS so that the conversion is always performed. In the case of step SP56, it has been already known that the same file name does not exist through the operating system OS(0) at step SP52. Consequently, conversion is not necessary through the operating system OS(0) so that the name conversion flag is set as "1".

Further, the CDRFS proceeds to next step SP57 to set HT flag provided in the object name area of the file entry (FIG. 21) to "1" or "0". The HT flag represents whether or not the file name to be created which designated by the operating system OS(X) (=OS(0)) presently being used includes a mark "~" referred to as Tilda. When the tilda mark is used, "1" is set; when the tilda mark is not used, "0" is set. The HT flag is set for the sake of determination whether or not the file name coincides with a Distinct Name which will be mentioned later. If the HT flag is "1" (namely, the tilda mark is used), the file name may coincide with the distinct name; if the HT flag is "0" (namely, the tilda mark is not used), the file name and the distinct name are not same.

Consequently, the processes of aforementioned steps SP51 to SP57 decide the file name which does not coincide with the other file name on the CD-R disc DISC when under the operating system OS(0) presently being used.

The CDRFS determines whether or not it is necessary to change the file name decided at steps SP51 to SP57 as described above when seeing through the other operating systems OS(1) to OS(N). Then the processes according to the result of the determination are executed at the processes after step SP58 in FIGS. 33 and 34.

More specifically, the CDRFS start determining whether or not the file name coincides for the other operating system OS(X) (=OS(1)) by setting to X=1. Then the CDRFS proceeds to next step SP59 to create the file name referred to as Simple Name(X) (=Simple Name(1)) as the file name corresponding to the operating system OS(X) (=OS(1)) from the Object Name which is set in the file entry at above step SP54.

In the Simple Name(X) (=Simple Name(1)), the character out of the characters constituting the Object Name, which is unusable under the operating system OS(X) (=OS(1)) for present determination, is represented by an underline character "_" (hereinafter referred to as underbar), and the number of characters of the Object Name is curtailed up to the number acceptable as the file name of the operating system OS(X) (=OS(1)). Provided that, underbar is included in the number of characters.

For instance, the Object Name set at aforementioned step SP54 is AAA/// and the operating system OS(1) is MS-DOS, a slash mark / cannot be used in the operating system OS(1) so that all the slash mark / is replaced with the underbar. In addition, a file name permitted on the operating system OS(1) is limited to eight characters plus three characters (extension) at maximum, so that the CDRFS regards top eight characters of the Object Name and extension (three characters) as the Simple Name(1). For example, if a file name is ABCDEFGHIJK.TXT, Simple Name(1) is reduced to ABCDEFGH.TXT. Incidentally, extension shown in three characters below the dot mark represents file type for MS-DOS, by which the application soft AP is executed. Consequently, the extension remains as the Simple Name(1).

As described above, when obtaining the Simple Name(X) (=Simple Name(1)) which is created in the form readable by the operating system OS(X) (=OS(1)), the CDRFS proceeds to step SP60 to determine whether or not the Simple Name (X) (=Simple Name(1)) is used in the other file. More specifically, at step SP60, the CDRFS searches whether or not there exist any files having same file name as the Simple Name (X) (=Simple Name(1)) corresponding to the operating system OS(X) (=OS(1)) in the file entry read from the CD-R disc DISC on the RAM 7 throughout all the files on the CD-R disc DISC. While searching, the CDRFS once converts all the files on the CD-R disc DISC to the search key CRC and also converts the Simple Name(X) (=Simple Name(1)) to the search key CRC. Then the CDRFS searches the file name in which at least the search key CRC coincides with the search key CRC of the Simple Name (1). The CDRFS converts the file name found that the search key CRC coincides to the file name readable by the operating system OS (X) (=OS(1)), and determines whether or not the converted file name coincides with the Simple Name(1). This enables to search whether or not there exists the file name which coincides with the Simple Name (1) readable by the first operating system OS(1) when the file name already written on the CD-R disc DISC is converted to the file name readable by the first operating system OS(1).

If a negative result is obtained at step SP60, this means that there exists no file name coincident with Simple Name (1) when the file names written on the CD-R disc DISC are converted to the file names readable by the first operating system OS(1) so that it is not necessary to convert the Simple Name (1). At that time, the CDEFS proceeds to step SP61 to set Name Conversion Flag (1) (NC(1)), which is set corresponding to the first operating system OS(1), to "1".

On the contrary, if an affirmative result is obtained at step SP60, this means that there exists the file name coincident with Simple Name (1) when the file names written on the CD-R disc DISC are converted to the file names readable by the first operating system OS(1) so that it is necessary to convert the Simple Name (1). At that time, the CDEFS proceeds to step SP62 to set Name Conversion Flag (1) (NC(1)), which is set corresponding to the first operating system OS(1), to "0".

As described above, when the Name Conversion Flag (1) is set at steps SP61 or SP62, the CDRFS proceeds to next step SP63 to determine whether or not the value of X is the value N, namely it is below the number of a plurality of operating systems OS(X). If an affirmative result is obtained here, this shows that it is not finished yet to set the Name Conversion Flag (X) corresponding to all operating systems OS (X) (OS(1) to OS(N)). At that time, the CDRFS adds 1 to X at step SP64, and then returns to aforementioned step SP59 to create the Simple Name (2) which is readable by new operating system OS(X) (=OS(2)) from the Object Name set at aforementioned step SP54.

The CDRFS executes the processes of aforementioned steps SP60 to SP63 also for the Simple Name (2) created as described above. Thereby when all the file names on the CD-R disc DISC are converted to the file names readable by the operating system OS(2), the search is executed about whether or not there exists the file readable by the operating system OS(2), which coincides with the Simple Name (2). Also, the CDRFS sets the Name Conversion Flag (2) set corresponding to the operating system OS(2) to "1" or "0" in accordance with the existence of coincidence.

As described above, the Name Conversion Flag (2) is set corresponding to the operating system OS(2), the CDRFS adds 1 to X at step SP64 and sets the Name Conversion Flag (3) corresponding to new operating system OS(3). In this manner, repeating the procedures of steps SP59 to SP64, the CDRFS searches, in the operating system OS(1) to OS(N), whether or not the Simple Name (X) created corresponding to each operating system OS(X) coincides with the file name already written on the CD-R disc DISC. Also, the CDRFS sets each Name Conversion Flag (X), which is set related to each Simple Name (X) corresponding to each operating system OS(X), to "1" or "0".

When finishing setting the Name Conversion Flag (X) corresponding to all operating systems OS(1) to OS (N), the CDRFS obtains a negative result at step SP63 and proceeds to step SP65 shown in FIG. 34. The processes after step SP65 shown in FIG. 34 are as follows: based on each Name Conversion Flag (1) to Name Conversion Flag (N) set related to each Simple Name (1) to Simple Name (N), the latter four characters of the Simple Name (X) which is necessary to convert are replaced with the tilda mark ~ and the number represented by three characters (Distinct Number), so that the Simple Name (X) is converted to the Distinct Name (X).

First, the CDRFS obtains an initial value of the Distinct Number (DNO) from the search key CRC at step SP65. More specifically, the CDRFS manages each file name in each number of search key CRC, which lines up the file names having same search key CRC as the internal management information. This enables to search easily.

Consequently, out of the search key CRC, the CDRFS have the maximum value of which the last file name is the Distinct Number out of a plurality of file names having the coincident search key CRC at step SP60. The value following the maximum value is set as initial value at step SP65.

The initial value of the Distinct Number (DNO) is set as described above, the CDRFS proceeds to succeeding step SP66 to set X=1 which is as the process to search whether or not there exists the file name coincident on the operating system OS(X). Moreover, the CDRFS sets the value of the number Y for memorize the operating system OS(X) by which the search is started. Here, the Number Y is set to "1" same as the number X.

The Distinct Name (X) is the file name that, when the Simple Name (X) cannot be used, predetermined number of latter character string of the Simple Name (X) (in this embodiment, four characters) is replaced with the Distinct Number so as to the file names on the operating system (X) does not coincide with each other. The Distinct Name (X) is used as the file name for the operating system OS(X). Here, former four characters remained at replacement is referred to as Distinct String.

All the operating systems OS(X) to which the CDRFS corresponds use common Distinct Number. Thus same Distinct String is used in all Distinct Name (X).

Here, the String converted from the Distinct Number is obtained by the following equations:

If DNO is 0 to 35, ~$m$[DNO mod36]            (10)

If DNO is 36 to 1331, ~$m$[(DNO−36)/36]$m$[(DNO−36) mod 36]            (11)

If DNO is 1332 to 47988, ~m[(DNO−1332)/1296]

m[((DNO−1332)−((DNO−1332)mod 1296))/36]

m[((DNO−1332)−((DNO−1332)mod 1296))mod/36]    (12)

Here, m[X] represents x-th character of the "0123456789ABCDEFGHIJKLMNOPQRSTUVWXYZ". For example, m[0] represents "0", and m[10] represents "A". Xmod Y represents the remainder when X is divided by Y.

Next, the CDRFS proceeds to step SP67 to see the Name Conversion Flag (X) (=Name Conversion Flag(1)) of the first operating system OS(X) (=OS(1)) designated at aforementioned step SP66. Being the Name Conversion Flag (1) 1 then, which means the operating system OS(1) does not need the Distinct Name, it is not necessary to determine whether or not the Distinct Name coincides. The CDRFS then proceeds to step SP69 to add 1 to X. At succeeding step SP73, the CDRFS determines whether or not the value X exceeds the preset number N.

If a negative result is obtained at step SP73, this shows that preset search processes corresponding all the operating systems OS(1) to OS(N) is not finished yet. At that time, the CDRFS proceeds to step SP75 to compare the value X with the value Y. In this case, unfinished search process makes the value X not to coincides with the value Y, so that the CDRFS obtains a negative result and then returns to aforementioned step SP67 to determine the Name Conversion Flag (2) for next operating system OS(2).

On the other hand, if an affirmative result is obtained at step SP73, which shows that the preset search processes corresponding to all the operating system OS(1) to OS(N) are done, the CDRFS proceeds to step SP74 to set X=1 so as to return the value X to the initial value. Then the CDRFS proceeds to step SP75 to compare the value X with the value Y. At that time, the value X is returned to the initial value "1", which gives the CDRFS an affirmative result, so that the CDRFS proceeds to step SP76. In this manner, when it is not necessary to convert the Simple Name (X) created corresponding to the operating system OS(X) as a result of the determination at aforementioned step SP67, it can be found that the Simple Name (1) to the Simple Name (N) created corresponding to respective operating systems OS(1) to OS(N) based on the file name (Object Name) to be created in the operating system OS(0) can be used.

Consequently, the CDRFS determines at step SP76 to use the Simple Name (1) to the Simple Name (N) based on the Name Conversion Flag (1) to the Name Conversion Flag (N) (=1) which are set corresponding to each Simple Names, and then finishes the file name conversion processes. Thus the new file name (Object Name) which is specified by the operating system OS(0) and written on the file entry and the CD-R disc DISC at aforementioned step SP1 is converted by the CDRFS to the Simple Name (X) readable by all the operating system OS(X) so as to be accessed when each operating system OS(1) to OS(N) accesses the file name.

On the other hand, if a negative result is obtained at aforementioned step SP67, which shows that it is necessary to convert the Simple Name (X) created corresponding to the operating system (X) which is the object for determination at that time. The CDRFS proceeds to step SP69 to generate the Distinct String from the former characters of the Simple Name (X) which are remained by removing the latter four characters in order to add the Distinct Number. For example, in the case where the operating system OS(X) used at that time is the first operating system OS(1) and the operating system OS(1) is MS-DOS, the Simple Name (1) consists of eight characters+three characters (extension) and the four characters remained by removing four characters from the former eight characters (namely, top four characters) is set as a Distinct String. Incidentally, length of the Simple Name (X) differs depending on the operating system OS(X), so that length of the Distinct String differs depending on the operating system OS(X).

After generating the Distinct String, the CDRFS proceeds to step SP70 to create the Distinct Name (X) (=Distinct Name(1)) from the Distinct Number and the Distinct String set at aforementioned steps SP65 and SP69. The Distinct Name (X) is created by arranging the Distinct String at the top portion and the Distinct Number next to the Distinct String. Incidentally, the Distinct Number is converted to be a String.

The initial value of the Distinct Number set at aforementioned step SP65 is used in the Distinct Name (1) created as described above, which prevents from coincident with the other file name. If, however, the user already creates a file name through a operating system OS(X) by using the tilda mark ~, there may exist a file name coincident. Thus the CDRFS proceeds to succeeding step SP71 to determine whether or not the created Distinct Name (1) can be used (namely, the Distinct Name (1) coincides with the other file name).

At this step SP71, the CDRFS searches all file names already created whether or not there exist any file name whose search key CRC coincides and which has the tilda mark ~ (namely, HT(1)=1) in the file entry read out from the CD-R disc DISC. At that time, the determination in which there exists coincident file makes the CDRFS compare the file name itself so as to determine whether or not it coincides. As a result, if the file name coincides, the CDRFS obtains a negative result at step SP71, and proceeds to step SP72 to add the Distinct Number (DNO) "1".

At that time, the change of the Distinct Number to new value causes the possibility that there exists the Simple Name (1) having same Distinct Number as the new Distinct Number on the operating system OS(X) (=OS(1)) searched till then. Consequently, substituting the value X for the number Y, the CDRFS renews from the operating system OS(X) at starting of the search to the operating system OS(1) at operating, in which the search is started from the first operating system and executed throughout the operating systems OS(1) to OS(N). In this manner, each time the coincident Distinct Name (X) is generated, the operating system OS(X) is shifted to the OS(X) at operating so that the search is repeated every operating system till the operating system OS(X) comes out again. This enables to surely search all the operating systems OS(1) to OS(N).

After finishing the process at step SP72, the CDRFS repeats the processes of aforementioned steps SP69, 70, 71 and 72 till the Distinct Name (1) does not coincide. In this manner, Since the Distinct Number is renewed till it does not coincide in the same operating system OS(X), the search time can be reduced considerably, comparing with the case of returning to the first operating system OS(X).

Here, if an affirmative result is obtained at step SP71, this shows that there exists no file name coincident with the Distinct Name (1) using the set Distinct Number and the Distinct Name (1) can be used. The CDRFS proceeds to step SP69 to add "1" to X so as to specify the second operating system OS(2). Further, at step SP75, the CDRFS compares the number X representing the present operating system OS(X) (=OS(2)) with the value Y representing the operating system at starting which is renewed at aforementioned step SP72. If they do not coincide with each other, the CDRFS returns to aforementioned step SP67.

Consequently, at step SP67, the CDRFS examines the Name Conversion Flag (2) set corresponding to the operating system OS(2) so as to determine whether or not the Simple Name (2) corresponding to the operating system OS(2). If a negative result is obtained here, the CDRFS repeats the processes of steps SP69, SP70, SP71 and SP72 till the Distinct Name (2) of the operating system OS(2) does not coincide with the other file names.

Then, if an affirmative result is obtained at step SP71, the CDRFS proceeds to step SP69 to add "1" to X, which changes the search object to new operating system OS(3). At step SP75, the CDRFS determines whether or not the operating system OS(3) is set as an operating system OS(X) at starting at step SP72. The processes of steps SP69, SP70, SP71 and SP72 are repeated till the operating system OS(X) which is set as the operating system comes out again.

When finishing searching and setting the Distinct Name (X) for all the operating systems OS(1) to OS (N), the CDRFS determines to use properly the Simple Name (X) or the Distinct Name (X) created corresponding to each operating system OS(1) to OS(N) based on the Name Conversion Flag (1) to the Name Conversion flag (N) set corresponding to which it is usable or unusable at step SP76, and set it in the file entry. Then the CDRFS finishes the file name conversion process. Thus the new file name (Object Name) specified by the operating system OS(0) and written in the file entry the CD-R disc DISC at step SP1 is converted to the Simple Name (X) or the Distinct Name (X) by the CDRFS so as to be accessed when each operating system OS(1) to OS(N) accesses the file name.

Figure 35:
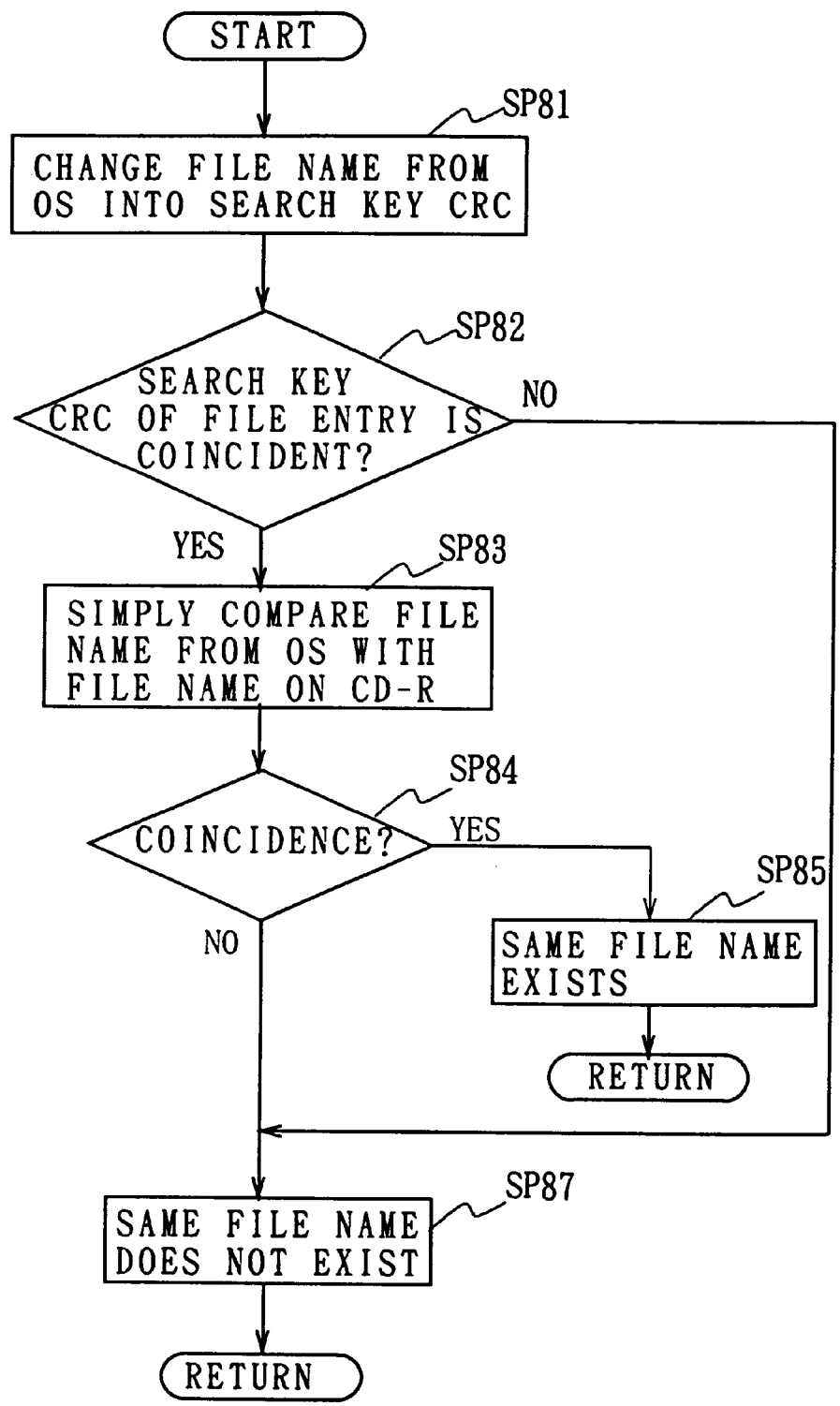
FIG. 35 is a flowchart showing the search procedure used in the file name conversion method.

Here, the detailed description of the search processes at aforementioned step SP52 (FIG. 32) and step SP60 (FIG. 33) will be given below. More specifically, FIG. 35 shows the search process executed at aforementioned step SP52. The CDRFS converts a new file name received from the operating system OS to the search key CRC at step SP81, and, at next step SP82, determines whether or not the search key CRC of the file entry coincide with the search key CRC obtained at step SP81.

If an affirmative result is obtained here, the CDRFS proceeds to step SP83 to compare the new file name received from the operating system OS with all the existing file names written in the CD-R disc DISC. At that time, the existing file names are read out via the file entry and are converted to the form which is readable by the operating system OS which specifies the new file name.

Consequently, the file names are compared with each other at step SP83 and are determined whether or not they coincide with each other. If a negative result is obtained here, the CDRFS proceeds to step SP87 to determine that there in no same file name seeing from the present operating system OS. Then the CDRFS obtains a negative result at step SP52 of FIG. 32 and proceeds to step SP54 (FIG. 32).

On the other hand, if a negative result is obtained at step SP82, this means that the search key CRC of the file name on the CD-R disc DISC read out via the file entry does not coincide with the search key CRC of a new file name received from the operating system OS. At that time, the CDRFS proceeds to step SP54 of FIG. 32 via step SP87.

If an affirmative result is obtained at step SP84, this means that not only the search key CRC but the file name itself coincide. At that time, the CDRFS proceeds to step SP85 to determine that there exists same file name as new file name seeing from the operating system OS. Then, the CDRFS proceeds to step SP53 of FIG. 32.

In this manner, since the CDRFS compares the file name itself with the new file name merely whose search key CRC coincides, the search time can be reduced comparing the case of comparing file name itself on all the file name. In addition, the search processes shown in FIG. 35 are executed also similarly at step SP60 aforementioned about FIG. 33.

Figure 36:
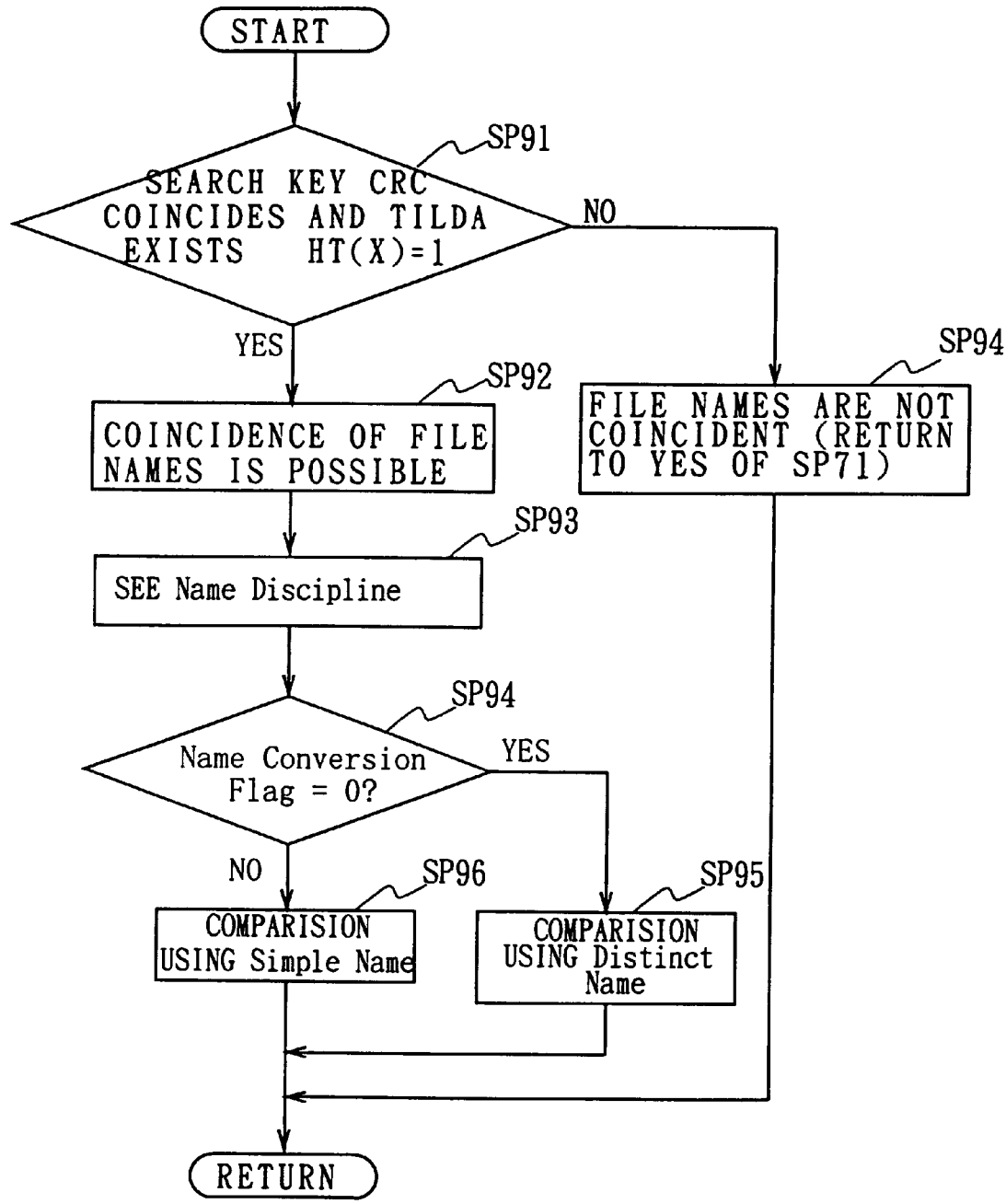
FIG. 36 is a flowchart showing the search procedure used in the file name conversion method.

FIG. 36 shows details of the processes of searching the Distinct Name (X) at step SP71 aforementioned about FIG. 34. When the search key CRC of new file name coincides and a tilda mark ~ is included, an affirmative result is obtained at step SP91. In this case, only the condition of both coincidence of the search key CRC and existence of the tilda mark can generates possibility of coincidence of file name, so that the CDRFS proceeds to step SP93 via step SP92 to see the Name Discipline. Further, the CDRFS determines corresponding Name Conversion Flag (X) from the Name Discipline at step SP94. If the determination result shows that the Simple Name (X) is already used, the CDRFS proceeds to step SP95 to compare whether or not the file name coincides by using the Distinct Name. If the comparing result shows that there is no coincidence, the CDRFS obtains an affirmative result at step SP71 aforementioned about FIG. 34 a nd proceeds to step SP69.

On the other hand, if the comparing result shows that there is coincidence, the CDRFS obtains a negative result at step SP71 aforementioned about FIG. 34 and proceeds to step SP72.

Further, if the determination result of the Name Conversion Flag (X) at step SP94 of FIG. 36 shows that the Simple Name (X) can be used, the CDRFS proceeds to step SP96 to compare whether or not the file name coincides by using the Simple Name (X). If the comparing result shows that there is no coincidence, the CDRFS obtains an affirmative result at step SP71 aforementioned about FIG. 34 and proceeds to step SP69.

On the other hand, if the comparing result at step SP96 shows that there is no coincidence, the CDRFS obtains a negative result at step SP71 aforementioned about FIG. 34 and proceeds to step SP72.

Further, if a negative result is obtained at step SP91 of FIG. 36, this means that the Distinct Name (X) created based on the new file name does not coincide with the file names already exist on the CD-R disc DISC. At that time, the CDRFS obtains an affirmative result at step SP71 aforementioned about FIG. 34 via step SP94.

Next, the description will be made on the file name converting method and concrete example of generation of the search key CRC.

In FIG. 37, the number given as the Distinct Number (DNO) is converted to a String for using the Distinct Name (X). More specifically, the String shows the Distinct Number by numerals and alphabets and 0 to 9 themselves in the Distinct Number consists the String. In addition, in 10 to 36 in the Distinct Number, 10 is replaced with A of alphabet, 11 is replaced with B of alphabet, and the following numbers to 36 are successively replaced with alphabets. Thus 36 in the Distinct Number becomes Z of alphabet.

Further, 37 in the Distinct Number becomes a number of two FIGS. 00 as a String; 38 in the Distinct Number becomes a number 01 as a String; the Distinct Number increases one by one till 09 as a String. As a result, 09 in the String is 46 in the Distinct Number. Further, 47 in the Distinct Number becomes 0A in a String; the Distinct Number increases one by one alphabetically. Consequently, $36^3$ types of numbers can be represented by the String of three figures consisting of number and alphabet.

The String formed in the manner described above is replaced with or added to the latter characters of the Simple Name (X) created corresponding to each operating system OS(X), which generates the Distinct Name (X), as shown in FIG. 37.

In addition, the search key CRC is created in such a way as shown in FIG. 38 that first an extension of the file name to which the search key CRC is added and depending on the position of "." included in the file name is divided. More specifically, when "." is positioned in the middle of the file name other than at the top or end of the file name, characters behind "." are treated as an extension of the file. For example, a file name "test." does not have any character behind ".", so that this file name is regarded as having no extension. Also, with a file named "a.b.c.d", "d" is regarded as an extension of the file.

Next, the first four characters of Object Name are all converted to numerals 0 to 9, capital letters of alphabet, or an underbar "_" in accordance with the method as shown in FIGS. 39 and 40. For reference, the Object Names are all treated using unicode (Unicode) in the CDRFS Since the unicode represents all kinds of characters with a single fixed-length code, a conversion between different characters can be readily made.

For example, 0x30–0x39, 0x61–0x7a, and 0x41–0x5a, falling under a range of character codes 0≦X<128 of the unicode correspond to actual characters of "0"–"9", "a"–"z", "A"–"Z", and special symbols, respectively, as shown in FIG. 39. These character codes are converted to "0"–"9", "A"–"Z", and "A"–"Z", respectively, while other character codes are converted to "_" (underbar). A conversion method as shown in FIG. 40 is applied to a range of character codes 128≦X≦65535 to convert all characters to numerals "0"–"9" or capital letters of alphabet "A"–"Z". As a result, a file name derived by converting Object Name appears, for example, as shown in FIGS. 32 and 33.

As described above, for example, 2-byte characters such as Hiragana and Kanji in Japanese or horizontally-enlarged characters are replaced with 1-byte characters such as numerals and capital letters of alphabet, so that in the process of creating the search key CRC, the conversion method according to the CDRFS can be used for the operating system OS used in the language environment except for Japanese (for example, English).

Further, the unicode cannot be used as the character code representing the file name in, for example, the MS-DOS. When the file name consists of Kanji or Hiragana, one Kanji is counted as two alphabets. Consequently, if the Distinct Name on the MS-DOS is created by the file name such as "あいうえ" on the System 7.5, the file is "あい~000".

Here, top four characters of the file name from the operating system OS is read in order to create the search key CRC, so that the search key CRC is created according to "あいうえ" on the System 7.5. On the contrary, on the MS-DOS, it is created according to "あい~0" on the MS-DOS, which makes the search difficult. Accordingly, one Kanji is converted to two alphabets by assuming that all the characters after 128 (0x0080) of the unicode needs 2 bytes although there are the characters which can show by one byte. The search key CRC created from the file "あいうえ" on the System 7.5 is created from "あい", i.e., "CUCW". The search key CRC created from "あい~000" on MS-DOS is also created from "あい", i.e., "CUCW". As a result, two search keys CRC on the System 7.5 and on MS-DOS are same, which makes the search possible. Incidentally, when less than four characters comprises the Object Name, the search key CRC is created by adding an underline mark (underbar) after the Object Name.

Here, an equation P(x) for calculating the search key may be given by a generator polynomial expressed by the following equation:

$$P(x)=x^{16}+x^{12}+x^{5}+1 \tag{13}$$

The search key CRC is set as shown in FIG. 43. In this case, a file name derived after converting Object Name, for example, "Abcd#123.efg" is "ABCD_123_EFG", where a character string for conversion is "ABCD" and the search key CRC is "0x3b3a", as shown in FIG. 44. As described above, creation of the search key CRC by only four characters makes the search easier than the case of creation of the search key CRC by eight characters because the coincident of the characters decreases.

Also, in FIG. 44 when the Object Name consists of less than four characters, for example "ab", a file name is converted to "AB " (space after AB is blank), and two underlines (underbars) are added after the resulting character string to produce a character string for conversion "AB__". As a result, the search key CRC using a cyclic code is "0xde7e". As described above, quite different search keys CRCs are derived even from similar file names, so that a file name can be searched easily.

Further, the search keys CRCs are made commonly usable on a plurality of operating systems OSs to eliminate the need for storing a large number of search keys CRCs, thus making it possible to reduce a storage capacity for the search keys. The information on the search keys CRCs, the Object Name, and the Distinct Name is stored in a file entry.

Incidentally, it is assumed that within attributes used in the respective operating systems OS(0), OS(1), OS(2), . . . , OS(N) registered in the CDRFS, those having the same characteristic are the same. For example, when an attribute is asked on the operating system OS(N), the CDRFS creates an attribute suitable for the operating system OS(N) from an attribute flag of a file on the CD-R disc DISC and transfers the attribute to the operating system OS(N). Similarly, when an attribute is written for a file name from the operating system OS(N), this attribute is converted to an attribute flag which is then written into an associated file on the CD-R disc DISC. In this way, even if the user determines an attribute to a file based on file specifications managed only on the operating system OS(N), the file can be readily referenced irrespective of the specifications of each operating system OS.

Explanation will be next given of how to actually create a new file on the CD-R disc DISC in the CD-R disc apparatus 2 configured as described above. First, when a file creation instruction is issued from an application software AP to the operating system OS, a file creation instruction for creating a file using a file name, for example, "ABCDEF-GHIJK.TXT" on a currently running operating system OS(0) is issued to the CDRFS. The CDRFS searches files on the CD-R disc DISC through the CD-R drive 5 to see whether or not a file named "ABCDEFGHIJK.TXT" already exists thereon. The CDRFS checks the first four characters of each file name received from the operating system OS(0) and compares file names of files having the same search key CRC. As a result of the comparison, if it is revealed that a file named "ABCDEFGHIJK.TXT" already exists on the CD-R disc DISC, the CDRFS notifies the operating system OS that the same file name is already present, and terminates the file name conversion procedure as an input error.

Conversely, if no file named "ABCDEFGHIJK.TXT" is found on the CD-R disc DISC on the operating system OS(0), the Object Name is written into the CD-R disc DISC. The CDRFS next writes a number corresponding to the operating system OS(0) into the Name Dicipline of a file entry, and sets the Name Conversion Flag (0) to "1". Here, it is determined whether or not the Object Name includes "~" (Tilda), and a HT Flag which is a flag indicative of the presence or absence of tilda is set to 1 or 0. In this way, a file name conversion method is determined for creating a file on the operating system OS(0).

Next, the file name is converted from the Object Name to the Simple Name (1) such that it can be accessed on the operating system OS(1), for example, MS-DOS. Here, the file name of the Object Name is first reduced simply to the form of eight characters plus three characters in conformity to MS-DOS to generate the Simple Name (1) "ABCDEF-G.TXT". Then, files on MS-DOS are searched to see whether or not a file having the same file name is present. If no file having the same file name is found, the Name Conversion Flag (1) is set to "1".

As a result, "ABCDEFG.TXT" is established as the Simple Name (1), so that the file named "ABCDEFGHIJK.TXT" can be referenced from MS-DOS. In this event, if the Object Name includes characters or symbols which cannot be used on MS-DOS, these characters or symbols are all replaced with underbars "_".

Conversely, if it is determined that a file named "ABCDEFG.TXT" already exists on the CD-R disc DISC, the CDRFS sets the Name Conversion Flag (1) to "0". Subsequently, it is determined for each of other operating systems OS(2)–OS(N) registered as the operating system OS whether or not a file having the same Simple Name (X) is present. As a result, at the time the number X exceeds the number of operating systems registered in the OS 6, it is revealed from the determination results that the Simple Name (X) is usable on all operating systems OS(X) or the Simple Name (X) is not usable on any operating system OS(X).

If the Simple Name (X) is not usable on any operating system OS(X), the CDRFS generates Distinct String and String to set the Distinct Name (X). For setting the Distinct Name (X), "ABCDEFGHIJK.TXT" or the Object Name is first assigned the Distinct Number as a unique number. Then, a flag of the Distinct Number associated with MS-DOS is set on for Distinct Number and the file "ABCDEFGHIJK.TXT". The Distinct Name (X) in MS-DOS is created by adding a character string such as "~0:" created in accordance with the Object Number (here it is assumed to be "0") to the Object Name to have the number of characters complying with the specifications of the operating system OS(X), i.e., MS-DOS, such as "ABCDEF~0.TXT".

Next, it is determined whether or not a file having the same name as the Distinct Name (1) exists on MS-DOS. If a file named "ABCDEF~0.TXT" exists on the CD-R disc DISC, the Distinct Number is incremented by one to change the Distinct Name (1) to "ABCDEF~1.TXT". Then, files on the CD-R disc DISC is searched to see whether or not a file named "ABCDEF~1.TXT" is present on the CD-R disc DISC viewed from the operating system OS(1). Subsequently, the Distinct Number is incremented until no file having the same Distinct Name (1) is found on the operating system OS(1), thus determining Distinct Name (1) which ends up to be a unique file name on the operating system OS(1).

As a result, it is determined whether the Distinct Name is used or the Simple Name is utilized when a file name is referenced on MS-DOS.

In the manner described above, Distinct Names are determined for Windows 95 as the operating system OS(2), UNIX as the operating system OS(3), and so on following the Distinct Name created for the operating system OS(1). Incidentally, the Simple Name is used when being usable for each operating system.

Also, when the Distinct Number is change d in the course of determining a reference method, a search is executed from a file name created on OS which imposes the most strict limitation on the number of characters. Specifically, within System7.X, Windows 95, UNIX, and MS-DOS, a search is started with a file name created on MS-DOS. When reference methods for referencing a file name on all the operating Systems registered in the CDRFS are determined as described above, the Distinct Number is simultaneously determined, so that Distinct Name is also determined.

For example, if the Distinct Number has eventually reached ten, the Distinct Name us ed for referencing "ABCDEFGHIJK.TXT" on MS-DOS is changed to "ABCDEF~A.TXT". The search key CRC, the Distinct Number, and the Object Name thus determined are recorded in the file entry.

Also, for reading a file, the search method such as that found in the procedure for determining a file name converting method can be used to search for a file required by the operating system OS. Further, for deleting a file, the file itself can be located by the aforementioned search method, so that a file entry associated therewith may only be deleted. This pointer also includes attributes, Object Name and so on of the file.

Further, for changing a file name, it is searched in accordance with the file name conversion procedure whether or not a changed file name is used by any file on an associated operating system, in a manner similar to the creation of a file. Then, the Object Name is generated, file name conversion methods are determined for all the operating systems OS(0), (1), (2) . . . , (N), and a subsequent file search is executed using the Object Name and the file name conversion methods.

Figure 45:
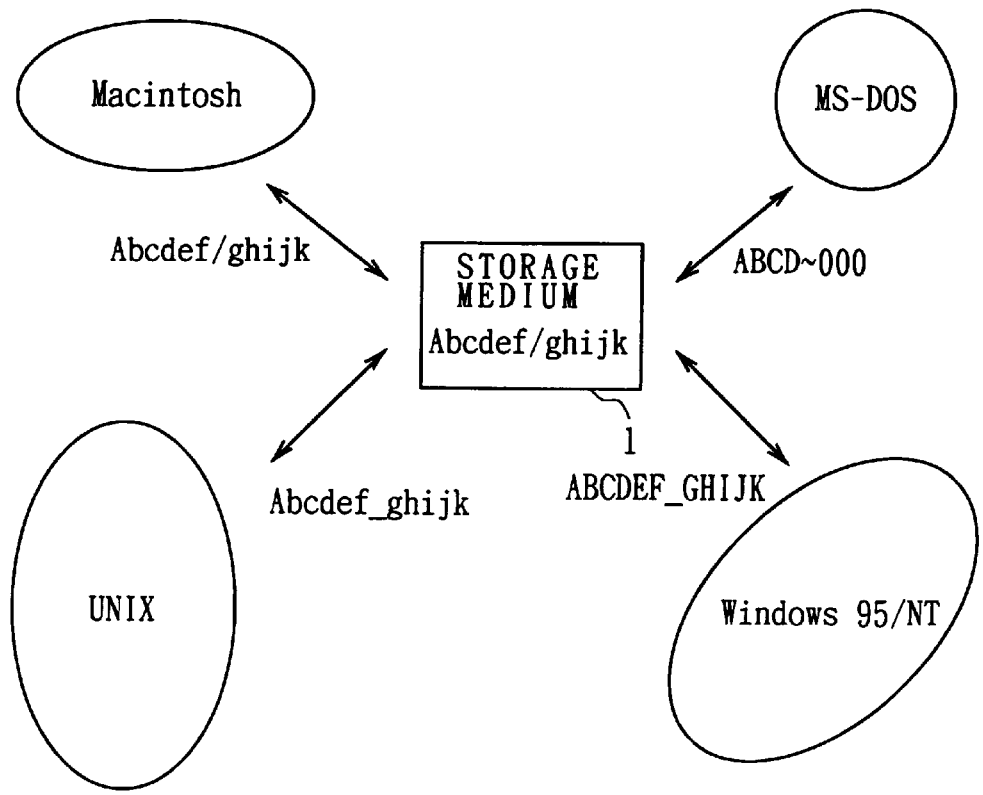
FIG. 45 is a schematic diagram explaining conventional file access.
Figure 47:
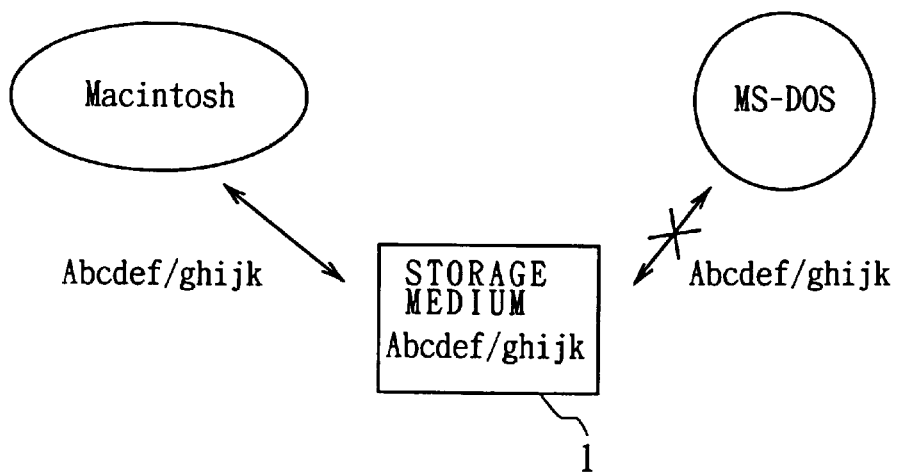
FIG. 47 is a schematic diagram explaining file access.

According to the foregoing configuration, the CDRFS having a plurality of operating systems OS(0), (1), (2) . . . , (N) registered therein sets a file name comprising Simple Name or Distinct Name universally adapted to the respective specifications imposed by all the operating systems OS(0), (1), (2) . . . , (N) in correspondence to the Object Name, so that even if the user determines a name and/or an attribute for a file based on file specifications managed only by, for example, the operating system OS(0), a file name can be readily created for the file and the file be accessed by any other operating systems OS(1), (2) . . . , (N), as shown in FIG. 45 (in the figure, OS(0) is assumed to be Macintosh), irrespective of the respective specifications imposed by all the operating systems OS(0), (1), (2) . . . , (N).

As described above, since a file created by the CDRFS in conformity to different specifications imposed by any of different registered operating systems are assigned file names in conformity to the specifications of the respective operating systems to permit the file to be created and/or accessed without any inconvenience, the burden on the user can be reduced, for example, when the CD-R disc DISC or the like is used as a removable storage medium, because the user is not required to perform operations for confirming an operating system which manages the storage medium, and so on.

Also, since file names (Simple Name or Distinct Name) corresponding to a plurality of registered operating systems are generated when a file is created through conversion of Object Name, the file names can be statically derived from the Object Name. In other words, it is possible to prevent a file name from changing each time the file name is referenced. Also, since a file name converting method is recorded instead of recording file names corresponding to the respective operating systems OS, the storage capacity can be reduced for managing the file names.

Further, Simple Name or Distinct Name is generated by modifying part of a character string forming the basic Object Name, so that the user can readily predict the contents of a file from the file name since Simple Name or Distinct Name allows the user to quickly recognize the Object Name which is the original file name.

Further, according to the aforementioned embodiment, when a plurality of operating systems OS(0), (1), (2) . . . , (N) are registered in a single computer, the plurality of operating systems can be installed in the same management region of a storage medium without partitioning the management region into dedicated subregions for each of the different operating systems having their own specifications, thus making it possible to save the storage region. Also, when this file management method is applied to a network server, the server need not have a management mechanism for each operating system.

Furthermore, according to the aforementioned embodiment, since the same file can be used on all registered operating systems OSs, music software and video software such as multimedia CD need not be manufactured in conformity to each operating system OS, thus allowing the manufacturer to reduce a manufacturing cost. As a result, software, which has been so far provided only in conformity to the specifications of one OS, can be utilized likewise by other types of operating systems OSs, thereby increasing options of software, and preventing the user from inadvertently purchasing software for a different operating system.

Furthermore, according to the aforementioned embodiment, since method for universally adopted to all registered operating systems Oss and a multi-lingual scheme in correspondence to all language are employed, it is not necessary to convert a Japanese file name to a file name of another language even if a file created with a Japanese file name is to be sent to a foreign country. Therefore, the present invention can also be utilized as file transfer means.

Here in the CD-R disc apparatus 1, the search method and the procedure for determining a file name conversion method may be utilized to create a link file which can be used by all registered operating systems. Generally, a so-called link file contains file names of other files written therein such that a file management program, upon receiving a file read instruction from an operating system OS, passes the contents of a file, essentially desired by the operating system OS to reference, to the operating system OS based on the information written in the link file.

However, even if such a link file is created for a portable floppy disk which is used in changed operating system OS, the link file cannot be utilized by a plurality of operating systems because file names differ from one operating system to another, thus causing a phenomenon, for example, where a link file created by an operating system OS(A) can be utilized exclusively by the operating system OS(A), and a link file created by an operating system OS(B) can be utilized exclusively by the operating system OS(B).

On the contrary, when such a link file is utilized in the CDRFS, a file entry is referenced to determine on which operating system OS the link file was created, and a file name conversion method suitable for the operating system, on which the file link was created, may be used to convert a file name in the link file to specify a desired file. In this way, the link file can be utilized on all registered operating systems OSs.

Now, an example of a link file created on the operating system OS of System 7.5 will be described. Assuming, for example, that a referenced file is named "hijklmn" in a folder named "abcdefg", "abcdefg:hijklmn" is described in the link file for referencing the location of the file. In this event, since a file name written in lower case characters cannot used after the file management is transferred to MS-DOS in a conventional file management method, lower case characters in the folder name and the file name are converted to upper case characters, whereby "a file named hijklmn in a folder named abcdefg" is changed to "a file named HIJKLMN in a folder named ABCDEFG". Therefore, even if the link file is referenced, the link file will answer that such a file does not exist.

In this case, the file search method of the CDRFS is used to determine that the link file was created on System 7.5. Then the file search method is employed in order to determine the file name not by searching the file name on MS-DOS but by checking a file conversion flag of System 7.5 on a file entry. Therefore it can be find out that "a file named hijklmn in a folder named abcdefg" have been changed to "a file named HIJKLMN in a folder named ABCDEFG". In this way, the contents of "a file named HIJKLMN type in a folder named ABCDEFG" can be returned to the operating system.

While the foregoing embodiments have been described in connection with the CD-R disc DISC, which is a write-once disc, as a storage medium, the present invention is not only limited to this, but can be applied to a wide variety of general recording media, such as a floppy disk, CD (Compact Disc), and so on. Also, storage media other than disk-type ones, for example, card-type ones can also be used.

Also, while the foregoing embodiments have been described in connection with the CD-R disc DISC as a storage medium, the present invention is not only limited to this, but also alternatively CD-ROM (Compact Disc-Read Only Memory) or the like, for example, can be used. In such case, CD-ROM can be accessed in the CD-R disc apparatus 1 from the operating system OS through a CD-ROM device driver 30 (FIG. 1).

According to the present invention as described above, in an information processing apparatus for accessing a file recorded on a recording medium in conformity to specifications defined by a plurality of operating systems, means for converting a first file name based on the specifications of an operating system used for file creation/file name change to a second file name based on the specifications of an operating system used for accessing the file is provided for all of the plurality of operating systems, thereby file accesses among a plurality of different plurality of operating systems can be realized.

Also, according to the present invention, a file name converting step is provided for converting a first file name set on any of the plurality of operating system to second file names corresponding to the specifications of all of the plurality of operating systems at the time of accessing a file recorded on a recording medium in conformity to specifications defined by the plurality of operating systems. Therefore it becomes possible to simplify the file access among a plurality of different operating systems having different specifications.

Industrial Usability

The present invention can be utilized to a system for processing information and recording it on a recording medium, for example an information processing apparatus using a write-once disc type of recording medium.

What is claimed is:

1. A file name conversion method, in an information processing apparatus having a recording medium with recorded file names thereon and operating by at least a first operating system, the method for converting a first file name which can be distinguished by said first operating system to a second file name which can be distinguished by both the first operating system and at least a second operating system, comprising:

a step for transferring said first file name from said first operating system;

a first same file name searching step for searching whether or not there exists said first file name on said recording medium;

a first file name writing step for writing said first file name on said recording medium in the case where no same file name is found at said first same file name searching step;

a first file name conversion step for converting said first file name to a third file name in correspondence to both said first operating system and said second operating system;

a second same file name searching step for converting the file name in conformity with said second operating system and searching whether or not the file name exists on said recording medium; and a step for assuming said third file name as said second file name in the case where no same file name is found at said second same file name searching step.

2. The file name conversion method according to claim 1, comprising the steps of:

deleting characters of said first file name which exceeds the number of characters permitted in said second operating system and creating a permitted file name; and replacing the characters in said permitted file name which are not permitted on said second operating system to permissive characters and creating said third file name.

3. The file name conversion method according to claim 2, wherein said replacing step replaces characters which are not usable on said second operating system out of the characters of said permitted file name with underbars.

4. The file name conversion method according to claim 1, comprising the step of:

terminating the file name conversion by outputting an error signal when said first same file name searching step finds same file name.

5. The file name conversion method according to claim 1, further comprising the steps of:

converting characters used in said first file name to numbers, capital letter of alphabets, or underbars based on character code assigned to each character of said first file name;

extracting a predetermined number of characters from top of said converted file name so as to generate an extracted file name;

generating a search key based on character code of each character of said extracted file name; and recording said search key on said recording medium.

6. The file name conversion method according to claim 5, wherein said first same file name searching step comprises the steps of:

converting the characters used in said first file name to numbers, capital letter of alphabets, or underbars based on character code assigned to each character of said first file name;

extracting a predetermined number of characters from top of said converted file name so as to generate an extracted file name;

generating a second search key based on character code of each character of said extracted file name; and determining whether or not said second search key and said search key recorded on said recording medium are same and outputting the determination result.

7. The file name conversion method according to claim 6, comprising the steps of:

in the case of outputting the determination result that said second search key and said search key recorded on said recording medium at said determination result outputting step, deleting characters of said first file name which exceeds the number of characters permitted in said second operating system and creating a permitted file name;

replacing the characters in said permitted file name which are not permitted on said second operating system to permissive characters and creating said third file name; and assuming said third file name as said second file name.

8. The file name conversion method according to claim 5, wherein said second same file name searching step comprises the steps of:

converting the characters used in said third file name to numbers, capital letter of alphabets, or underbars based on character code assigned to each character of said third file name;

extracting a predetermined number of characters from top of said converted file name so as to generate an extracted file name;

generating a second search key based on character code of each character of said extracted file name; and determining whether or not said second search key and said search key recorded on said recording medium are same and outputting the determination result.

9. The file name conversion method according to claim 1, comprising:

in the case of finding same file name at said second same file name searching step, second conversion step for converting said first file name to said fourth file name so as to correspond to at least said second operating system; and a step for assuming said fourth file name as said second file name.

10. The file name conversion method according to claim 9, wherein said second same file name conversion step comprises:

a conversion number setting step for searching the number which is not used in said second file name conversion step and setting said number not used as an initial number;

a conversion step for converting said number to alphabets and numbers in accordance with a predetermined rule;

a creating step for creating a fourth file name by replacing at least a part of characters of said third file name with said alphabets and numbers;

a third same file name searching step for searching whether or not there exists said fourth file name on said recording medium seeing through said second operating system; and a repeating step for repeating said conversion step, said creating step, and said third same file name searching step assuming that said number to which a predetermined number is added is said number when same file name is found.

11. A file name conversion method, in an information processing apparatus having a recording medium with recorded file names thereon and operating by at least a first operating system, the method for converting a first file name which can be distinguished by said first operating system to a second file name which can be distinguished by both the first operating system and at least a second operating system, comprising:

a step for transferring said first file name from said first operating system;

a first same file name searching step for searching whether or not there exists said first file name on said recording medium;

a first file name writing step for writing said first file name on said recording medium in the case where no same file name is found at said first same file name searching step;

a first file name conversion step for converting said first file name to a third file name in correspondence to both said first operating system and said second operating system;

a second same file name searching step for converting the file name in conformity with said second operating system and searching whether or not the file name exists on said recording medium; and a step for assuming said third file name as said second file name in the case where no same file name is found at said second same file name searching step;

wherein, in the case of finding the same file name at said second same file name searching step, the method further comprises:

a second conversion step for converting said first file name to a fourth file name in correspondence to both said first operating system and at least said second operating system;

a third same file name searching step for searching whether or not there exists said fourth file name on said recording medium;

a step for assuming said fourth file name as said second file name; and an operating system discrimination number recording step for recording an operating system discrimination number for discriminating which operating system is the second operating system when the same file name is found at said third same file name searching step.

12. The file name conversion method according to claim 11, wherein said second conversion step comprises:

a conversion number setting step for searching for a number which is not used in said second file name conversion step and setting said not used number as an initial number;

a conversion step for converting said initial number to alphabets and numbers in accordance with a predetermined rule; and a creating step for creating a fourth file name by replacing at least a part of the characters of said third file name with said alphabets and numbers, and wherein said predetermined rule is presented by the following equations; if said initial number is 0 to 35:

said alphabets and numbers=m[DNO mod 36] if said initial number is 36 to 1331:

the first figure of said alphabets and numbers=m[(DNO−36) mod 36]

the second figure of said alphabets and numbers=m[(DNO−36)/36] if said initial number is 1332 to 47988:

the first figure of said alphabets and numbers=m[((DNO−1332)−((DNO—1332) mod 1296)) mod/36]

the second figure of said alphabets and numbers= m[((DNO−1332)−((DNO−1332) mod 1296))/36] the third figure of said alphabets and numbers m[(DNO−1332)/1296]

provided that, m[X] represents x-th character of the "0123456789ABCDEFGHIJKLM-NOPQRSTUVWXYZ" and X mod Y represents the remainder when X is divided by Y.

13. The file name conversion method according to claim 1, further comprising the steps of:

converting characters used in said first file name to numbers, capital letter of alphabets, or underbars based on character code of each character of said first file name;

extracting a predetermined number of characters from top of said converted file name so as to generate an extracted file name;

generating a search key based on character code of each character of said extracted file name;

recording said search key on said recording medium;

determining whether or not the file name on said recording medium contains a tilda mark so as to output the determination result; and recording said determination result on said recording medium.

14. The file name conversion method according to claim 1, wherein said third same file name searching step comprises the steps of:

converting the characters used in said first file name to numbers, capital letter of alphabets, or underbars based on character code assigned to each character of said fourth file name;

extracting a predetermined number of characters from top of said converted file name so as to generate an extracted file name;

generating a second search key based on character code of each character of said extracted file name;

determining that there is not said fourth file name on said recording medium when said second search key and said search key recorded on said recording medium are not same as a result of comparing;

reading the determination result whether or not said tilda mark is contained when said second search key and said search key recorded on said recording medium are same as a result of comparing; and determining that there is said fourth file name is not recorded on said recording medium when said reading step finds that a file name shown by said search key which is recorded on said recording medium does not contain said tilda mark.

15. A file name conversion method, in an information processing apparatus having a recording medium with recorded file names thereon and operating by at least a first operating system, the method for converting a first file name which can be distinguished by said first operating system to a second file name which can be distinguished by both the first operating system and at least a second operating system, comprising:

a step for transferring said first file name from said first operating system;

a first same file name searching step for searching whether or not there exists said first file name on said recording medium;

a first file name writing step for writing said first file name on said recording medium in the case where no same file name is found at said first same file name searching step;

a first file name conversion step for converting said first file name to a third file name in correspondence to both said first operating system and said second operating system;

a second same file name searching step for converting the file name in conformity with said second operating system and searching whether or not the file name exists on said recording medium;

a step for assuming said third file name as said second file name in the case where no same file name is found at said second same file name searching step; and a discrimination number writing step for writing an operating system discrimination number for discriminating which operating system said first operating system is on said recording medium.

16. The file name conversion method according to claim 15, further comprising the steps of:

recording the search result obtained at said second same file name searching step on said recording medium.

17. An information processing apparatus for converting a first file name which can be distinguished by a first operating system to a second file name which can be distinguished by both the first operating system and at least a second operating system, comprising:

storing means for storing a first operating system therein;

input means for inputting a file name therein from said first operating system;

first same file name searching means for searching whether or not there exists said first file name on said recording medium;

first file name writing means for writing said first file name on said recording medium in the case where no same file name is found by said first same file name searching means;

first file name conversion means for converting said first file name to a third file name in correspondence to both said first operating system and a second operating system;

converting means for converting said third file name to a fourth file name in conformity with both said first operating system and said second operating system;

second same file name searching means for searching whether or not said fourth file name exists on said recording medium; and means for assuming said third file name as said second file name in the case where no same file name is found by said second same file name searching means.

18. A file name conversion method, in an information processing apparatus having a recording medium with recorded file names thereon and operating by at least first operating system, the method for converting a first file name which can be distinguished by said first operating system to a second file name which can be distinguished by both the first operating system and at least a second operating system, comprising the steps of:

inputting a first file name from said first operating system;

converting the characters used in said file name to numbers, capital letter of alphabets, or underbars based on a character code assigned to each character of said file name;

extracting a predetermined number of characters from the top of said converted file name so as to generate an extracted file name; and converting said extracted file name to a search key based on the character code of each character of said extracted file name.

19. A recording medium, in an information processing apparatus having recording medium with recorded file names thereon and operating by at least a first operating system, on which is recorded a file name conversion program for converting a first file name which can be distinguished by said first operating system to a second file name which can be distinguished by both the first operating system and at least a second operating system, comprising:

a step for transferring a first file name from said first operating system;

a first same file name searching step for searching whether or not there exists said first file name on said recording medium;

a first file name writing step for writing said first file name on said recording medium in the case where no same file name is found at said first same file name searching step;

a first file name conversion step for converting said first file name to a third file name in correspondence to both said first operating system and said second operating system;

a second same file name searching step for searching whether or not the third file name exists on said recording medium; and a step for assuming said third file name as said second file name in the case where no same file name is found at said second same file name searching step.

* * * * *